US011901638B2

(12) United States Patent
Chainon et al.

(10) Patent No.: US 11,901,638 B2
(45) Date of Patent: Feb. 13, 2024

(54) DIPOLE ANTENNA

(71) Applicant: Nokia Shanghai Bell Co., Ltd., Shanghai (CN)

(72) Inventors: Sebastien Chainon, Begard (FR); Jeanpierre Harel, Lannion (FR); Thomas Julien, Lannion (FR); Jerome Plet, Louannec (FR); Eric Callec, Lannion (FR)

(73) Assignee: Nokia Shanghai Bell Co. Ltd., Shanghai (CN)

( * ) Notice: Subject to any disclaimer, the term of this patent is extended or adjusted under 35 U.S.C. 154(b) by 0 days.

(21) Appl. No.: 17/648,432

(22) Filed: Jan. 20, 2022

(65) Prior Publication Data

US 2022/0239017 A1 Jul. 28, 2022

(30) Foreign Application Priority Data

Jan. 25, 2021 (FI) ..................................... 20215077

(51) Int. Cl.
*H01Q 21/26* (2006.01)
*H01Q 9/28* (2006.01)
*H01Q 21/06* (2006.01)

(52) U.S. Cl.
CPC ............... *H01Q 21/26* (2013.01); *H01Q 9/28* (2013.01); *H01Q 9/285* (2013.01); *H01Q 21/06* (2013.01); *H01Q 21/062* (2013.01)

(58) Field of Classification Search
CPC ...... H01Q 21/26; H01Q 21/062; H01Q 9/285; H01Q 9/28; H01Q 21/06
USPC .......................................................... 343/702
See application file for complete search history.

(56) References Cited

U.S. PATENT DOCUMENTS 4,746,925 A * 5/1988 Toriyama ............... H01Q 9/285 343/793
6,067,053 A * 5/2000 Runyon ............... H01Q 21/205 343/820
6,307,510 B1 * 10/2001 Taylor ...................... H01Q 9/16 343/790
9,397,404 B1 * 7/2016 McDevitt ............... H01Q 21/08
2003/0231139 A1 * 12/2003 Tai ......................... H01Q 5/371 343/795
2005/0057417 A1 3/2005 Teillet et al. ................ 343/797
2009/0015496 A1 * 1/2009 Liu ...................... H01Q 21/065 343/742

(Continued)

FOREIGN PATENT DOCUMENTS

CN 1291365 A 4/2001
CN 102013560 A 4/2011

(Continued)

OTHER PUBLICATIONS

Li Quanping et aL "A Compact Broad E-Plane Beamwidth Magneto-Electric Dipole Antenna Array for UWB Application" Electromagnetics. vol. 39 No. 2. Feb. 17, 2019, pp. 80-88.

(Continued)

*Primary Examiner* — Hai V Tran
(74) *Attorney, Agent, or Firm* — Harrington & Smith

(57) ABSTRACT

An apparatus including a dipole antenna, configured for operation with a first polarization, the dipole antenna including a feed; and a pair of conductive elements fed by the feed, wherein the pair of conductive elements are grounded, and extend in parallel on opposing sides of the feed and then diverge.

21 Claims, 16 Drawing Sheets

(56) References Cited

U.S. PATENT DOCUMENTS

| | | | | |
|---|---|---|---|---|
| 2009/0135078 | A1 | 5/2009 | Lindmark et al. | 343/844 |
| 2013/0307743 | A1 | 11/2013 | Moon et al. | |
| 2016/0365641 | A1 | 12/2016 | Mayer et al. | 9/285 |
| 2018/0337462 | A1 | 11/2018 | Vollmer et al. | 21/26 |
| 2020/0006846 | A1* | 1/2020 | Lasiter | H01Q 21/08 |

FOREIGN PATENT DOCUMENTS

| | | | |
|---|---|---|---|
| CN | 103155278 | A | 6/2013 |
| CN | 203192944 | A | 9/2013 |
| CN | 103618135 | A | 3/2014 |
| CN | 105449378 | A | 3/2016 |
| GB | 2517735 | A | 3/2015 |
| JP | 2013042198 | A | 2/2013 |

OTHER PUBLICATIONS

Yang Guangwei et al. "A Multi-Band Magneto-Electric Dipole Antenna With Wide Beam-Width" IEEE ccess, IEEE vol. 8, Apr. 7, 2020, pp. 68820-68827.

* cited by examiner

DIPOLE ANTENNA

TECHNOLOGICAL FIELD

Embodiments of the present disclosure relate to a new dipole antenna. Some relate to a dual polarized antenna comprising the new dipole antenna. Some relate to an array of dual polarized antenna some of which comprises the new dipole antenna.

BACKGROUND

Electrical interference can occur between neighboring electrical conductors. This can cause problems when antennas are placed near to conductors within an apparatus.

A dipole antenna is a common form of antenna. It is designed to have a resonant frequency determined by a length dimension. The dipole normally has two opposing elongate arms. The arm of a dipole antenna often has a length that is just less than a quarter of a resonant wavelength of the dipole antenna.

BRIEF SUMMARY

According to various, but not necessarily all, embodiments there is provided an apparatus comprising:

a dipole antenna, configured for operation with a first polarization, the dipole antenna comprising:

a feed; and a pair of conductive elements fed by the feed, wherein the pair of conductive elements are grounded, and extend in parallel on opposing sides of the feed and then diverge.

In some but not necessarily all examples, the dipole antenna comprises a pair of dipole arms configured for the first polarization wherein one of the dipole arms comprises the pair of conductive elements.

In some but not necessarily all examples, the pair of conductive elements, where parallel, are parallel to a virtual line aligned with the first polarization and then diverge from that virtual line.

In some but not necessarily all examples, the pair of conductive elements diverge symmetrically from a virtual line aligned with the first polarization.

In some but not necessarily all examples, the pair of conductive elements, at least where they diverge, have reflection symmetry in a virtual line aligned with the first polarization.

In some but not necessarily all examples, the pair of conductive elements diverge via one or more pairs of correspondingly opposite bends.

In some but not necessarily all examples, each bend in a conductive element before an extremity of the conductive element defines a bearing, and a sum of said one or more bearings for one of the pair of conductive elements and a sum of said one or more bearings for the other one of the pair of conductive elements are different by substantially 90 degrees.

In some but not necessarily all examples, one of the pair of conductive elements extends substantially in a first direction to an extremity and the other of the pair of conductive elements extends substantially in a second direction towards an extremity, wherein the second direction is orthogonal to the first direction.

In some but not necessarily all examples, the conductive elements comprise an L-shaped portion wherein one limb of the L extends from a ground plane to a vertex of the L and the other limb of the L extends from the vertex parallel to the feed.

In some but not necessarily all examples, at least one of the pair of conductive elements bends towards or away from a ground plane.

In some but not necessarily all examples, the pair of conductive elements are asymmetric and bend towards or away from a ground plane by different amounts.

In some but not necessarily all examples, the pair of conductive elements are asymmetric and have different lengths.

In some but not necessarily all examples, the dipole antenna comprises:

another pair of conductive elements fed by the feed wherein the other pair of conductive elements are grounded, and extend in parallel on opposing sides of the feed and then diverge, wherein the pair of conductive elements extend in parallel on opposing sides of the feed in a first direction and the other pair of conductive elements extend in parallel on opposing sides of the feed in a direction opposite the first direction.

In some but not necessarily all examples, the apparatus comprises:

a second dipole antenna, configured for operation with a second polarization comprising:

a second feed; and a pair of conductive elements fed by the feed wherein the pair of conductive elements are grounded, and extend in parallel on opposing sides of the second feed and then diverge, wherein the dipole antenna and the second dipole antenna are co-located to form a dual-polarized antenna.

In some but not necessarily all examples, one of the pair of conductive elements of the dipole antenna, at an extremity, is interconnected to an extremity of one of the pair of conductive elements of the second dipole antenna.

In some but not necessarily all examples, the apparatus comprises a ground plane, wherein the feed is provided by a first planar printed wiring board that is orthogonal to the ground plane and the second feed is provided by a second planar printed wiring board that is orthogonal to the ground plane and orthogonal to the first planar printed wiring board, wherein the first planar printed wiring board and the second planar printed wiring board intersect to form a cross in a cross-section parallel to the ground plane.

In some but not necessarily all examples, the second dipole antenna comprises another pair of conductive elements fed by the second feed wherein the other pair of conductive elements are grounded, and extend in parallel on opposing sides of the second feed and then diverge, wherein the pair of conductive elements of the second dipole antenna extend in parallel on opposing sides of the feed in a second direction and the another pair of conductive elements of the second dipole antenna extend in parallel on opposing sides of the second feed in a direction opposite the second direction.

In some but not necessarily all examples, a first array of the dual polarized antennas are configured to operate at the same first operational frequency band.

In some but not necessarily all examples, the apparatus comprises a second array of second dual polarized antennas configured to operate at the same second operational frequency band that is different to the first operational frequency band, wherein the first dual polarized antennas of the first array and the second dual polarized antennas of the second array are interleaved.

According to various, but not necessarily all, embodiments there is provided a network node comprising the apparatus of any preceding claim.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
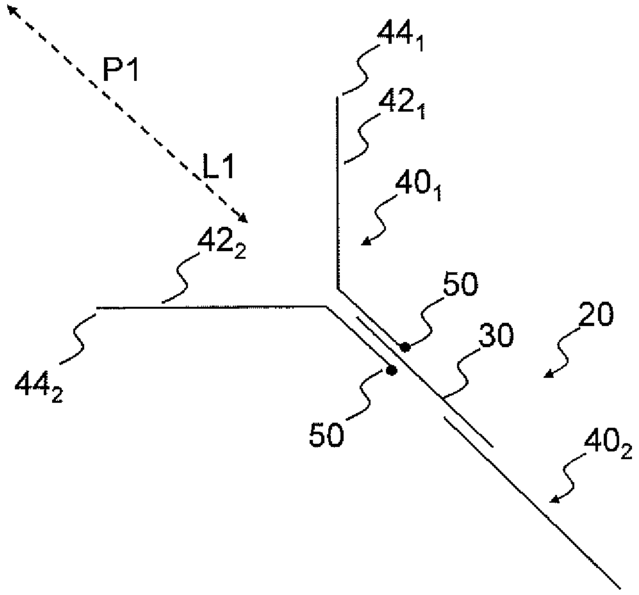
FIG. 1 shows an example of the subject matter described herein.

This disclosure including the description and drawings describes examples of an apparatus 10 comprising:

a dipole antenna 20, configured for operation with a first polarization P1, the dipole antenna comprising:

a feed 30; and a pair of conductive elements 42 fed by the feed 30, wherein the pair of conductive elements 42 are grounded 50, and extend in parallel on opposing sides of the feed 30 and then diverge.

The arrangement of the pair of grounded conductive elements 42 at the feed 30 improves performance. The use of a pair of conductive elements 42 increases the conducting surface area improving radiation performance. The position of the feed 30 between the grounded conductive elements 42 provides shielding at the feed 30.

The dipole antenna 20 is less susceptible to interference from electromagnetic fields at the feed 30.

The dipole antenna 20 provides a cheaper and easier to manufacture alternative to coaxial feedlines.

In at least some examples, a feed is an arrangement for transferring electro-magnetic energy between an antenna and radio frequency (RF) circuitry. In at least some examples a feed is a port or point of connection between an antenna and radio frequency (RF) circuitry. RF signals can be received by the antenna and provided to the RF circuitry and/or RF signals can be generated by the RF circuitry and provided to the antenna for transmission. RF circuitry can for example comprise transmitter and/or receiver circuitry. It can also include circuitry required for controlling or optimising the antenna performance.

Figure 8A:
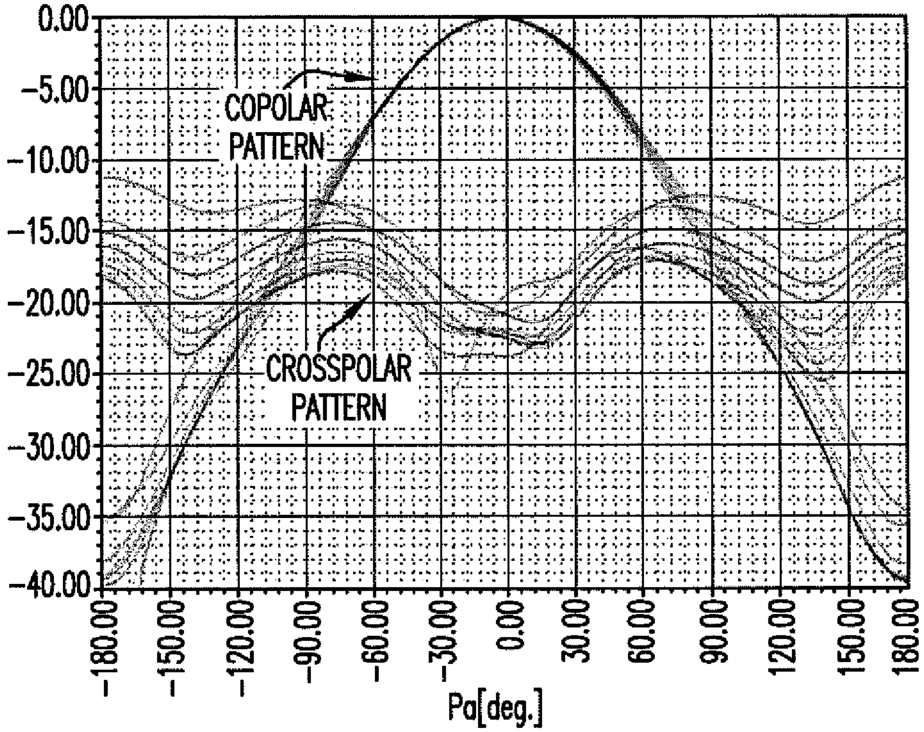
FIGS. 8A & 8B show results for an example of the subject matter described herein.
Figure 8B:
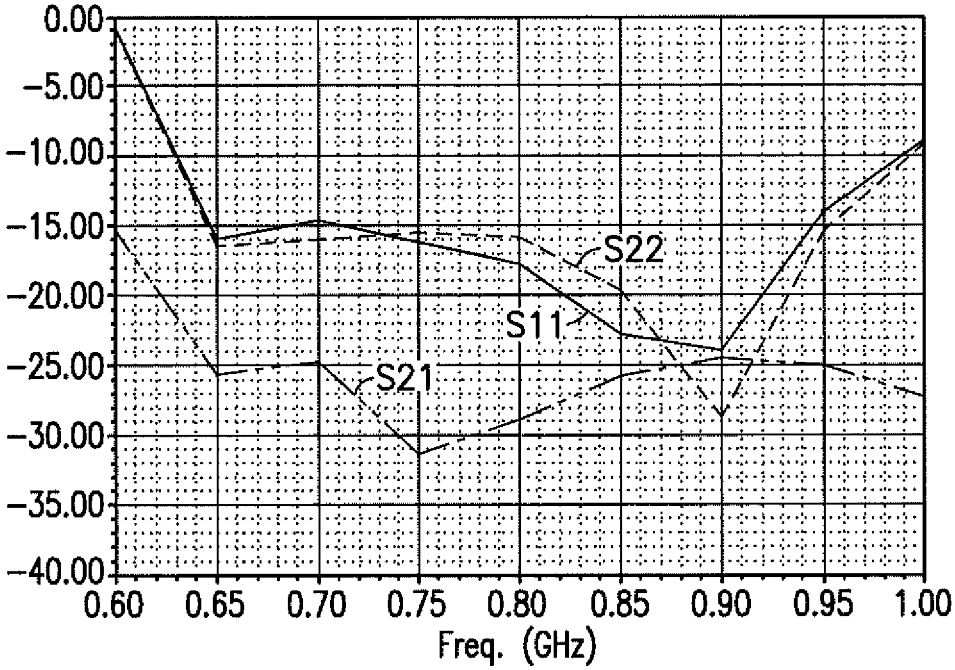

The dipole antenna 20 provides good radiating performance as illustrated in the results shown in FIGS. 8A, 8B; 10A, 10B; 12A, 12B; 14A, 14B; 21A, 21B.

Figure 9A:
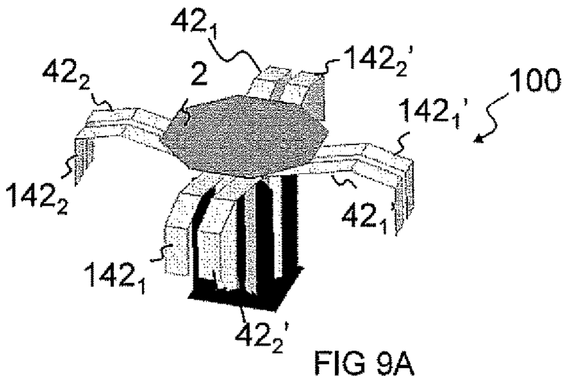
FIGS. 9A to 9D show another example of the subject matter described herein.
Figure 9B:
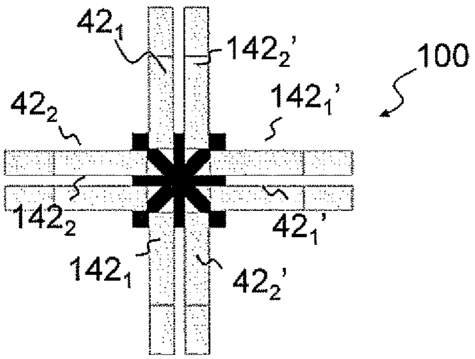
Figure 9C:
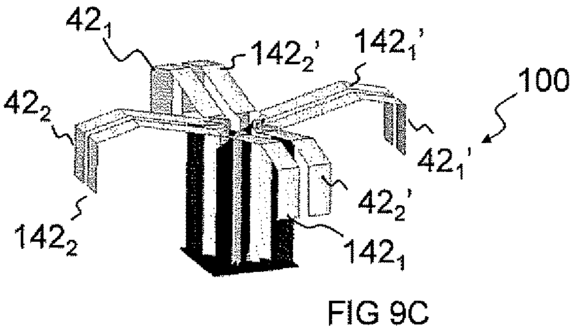
Figure 9D:
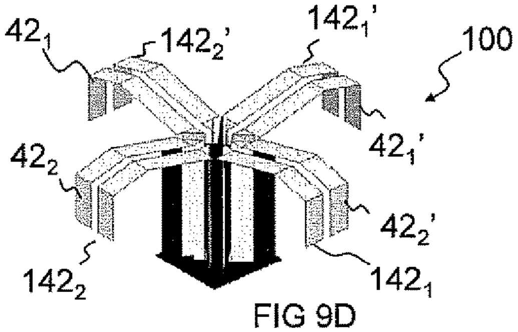
Figure 10A:
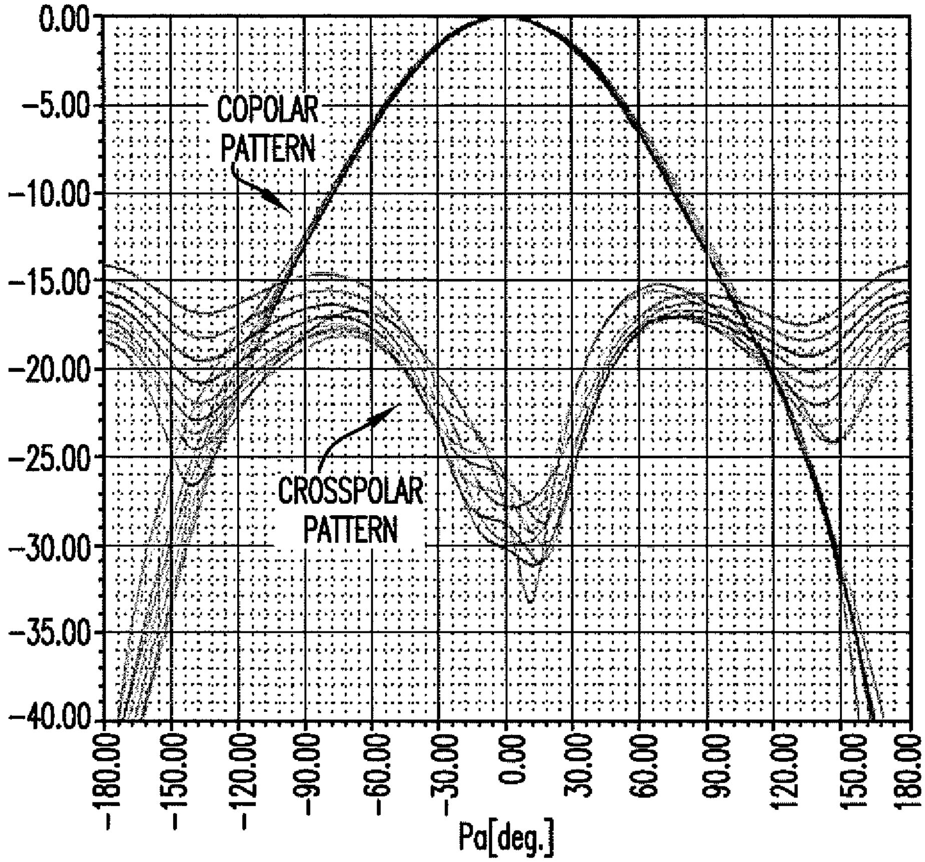
FIGS. 10A & 10B show results for an example of the subject matter described herein.
Figure 11A:
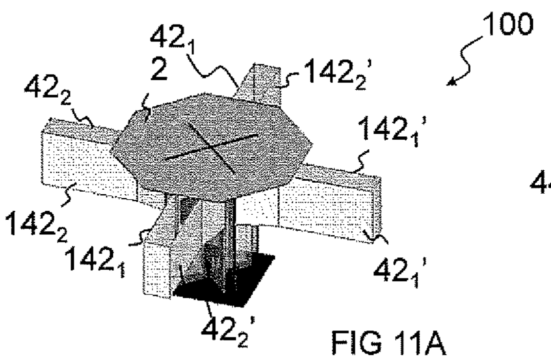
FIGS. 11A to 11D show another example of the subject matter described herein.
Figure 11B:
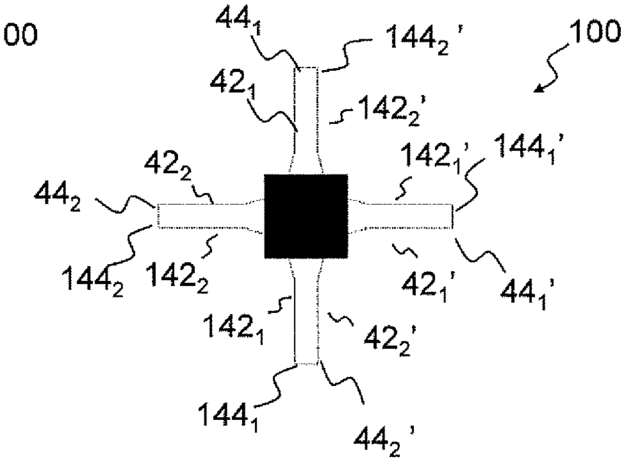
Figure 11C:
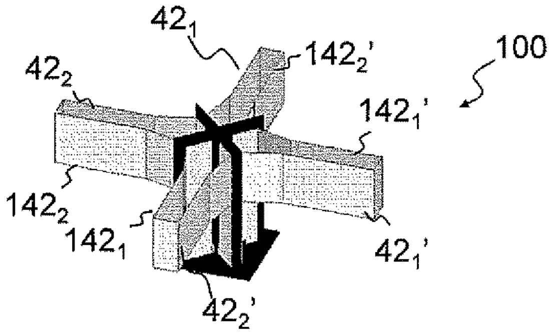
Figure 11D:
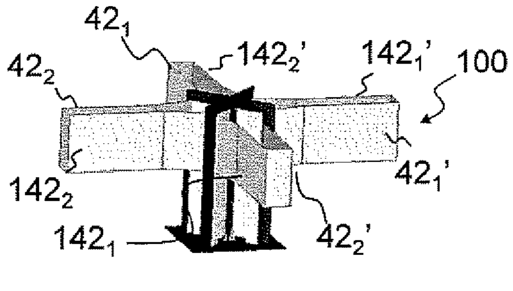
Figure 12A:
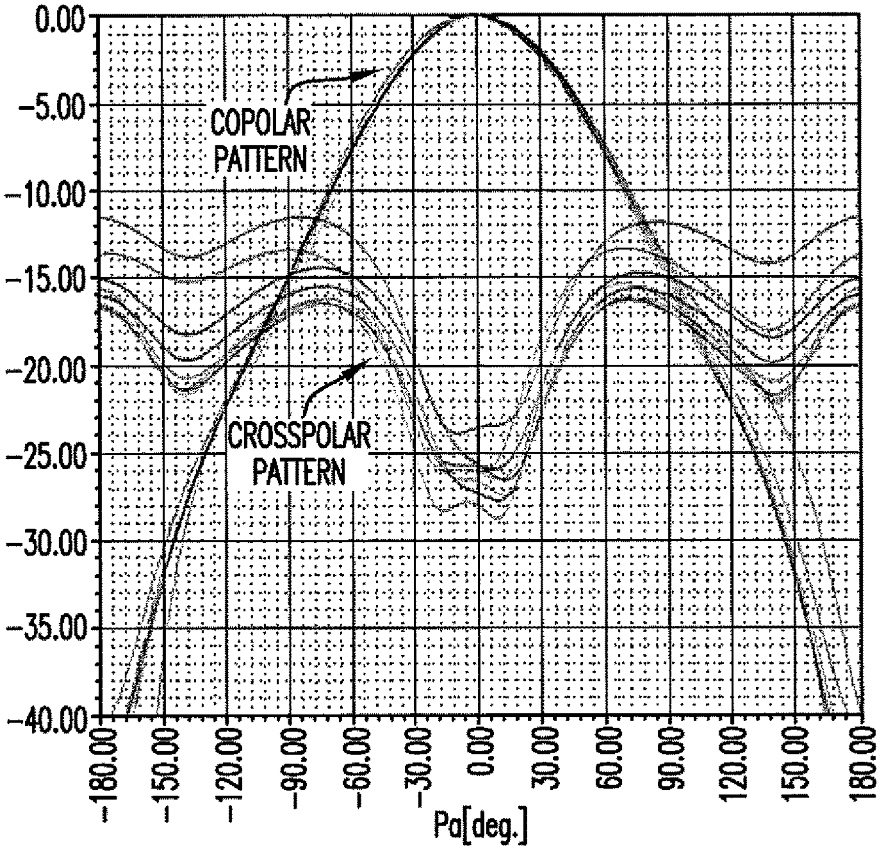
FIGS. 12A & 12B show results for an example of the subject matter described herein.
Figure 13A:
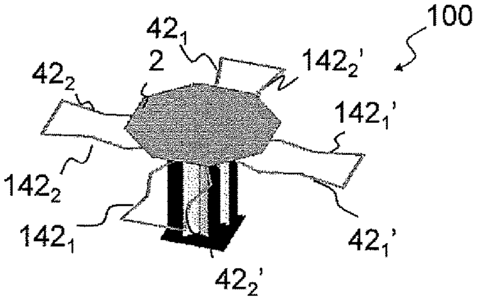
FIGS. 13A to 13D show another example of the subject matter described herein.
Figure 13B:
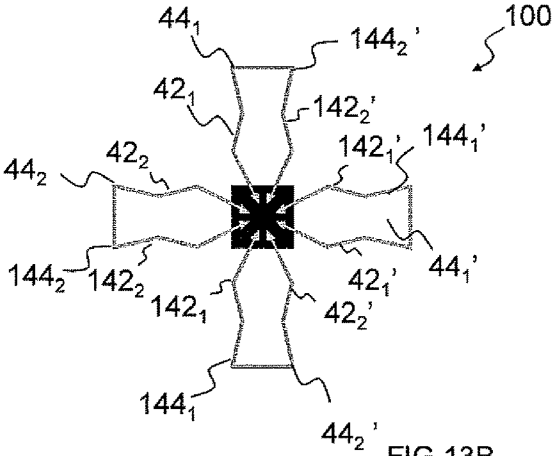
Figure 13C:
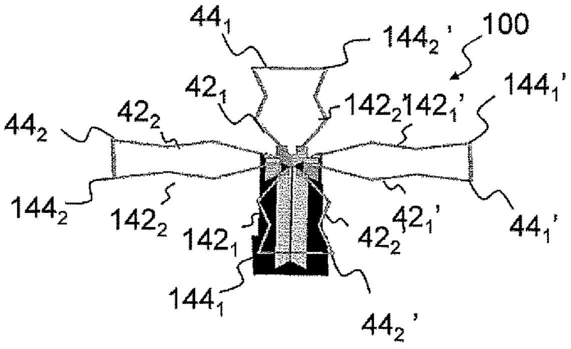
Figure 13D:
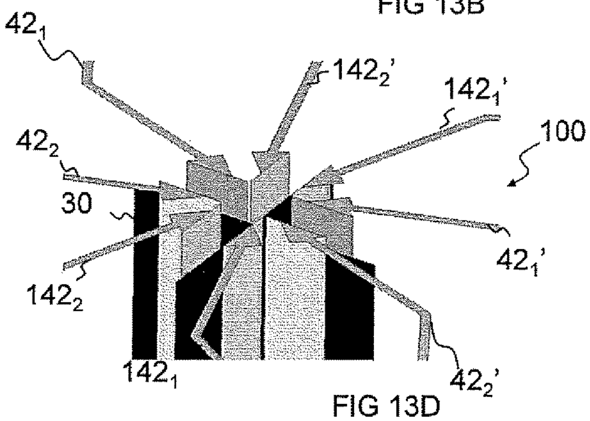
Figure 14A:
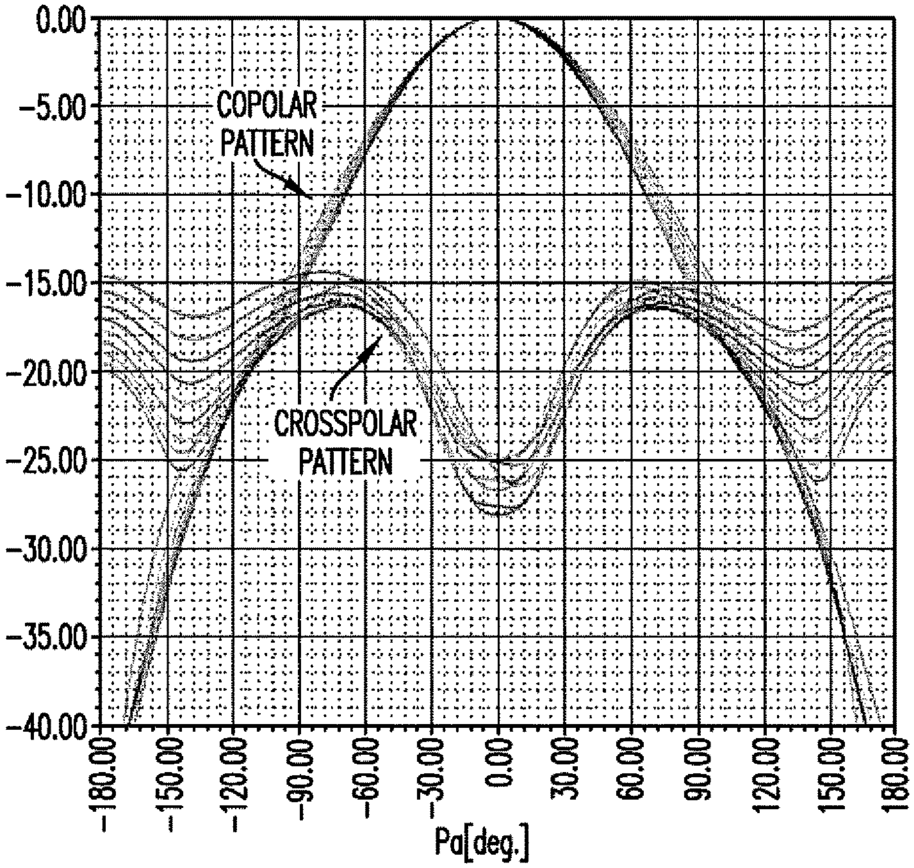
FIGS. 14A & 14B show results for an example of the subject matter described herein.
Figure 20A:
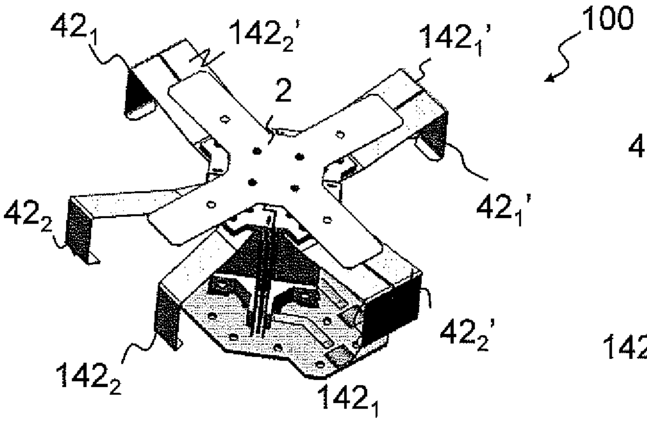
FIGS. 20A & 20B show another example of the subject matter described herein.
Figure 20B:
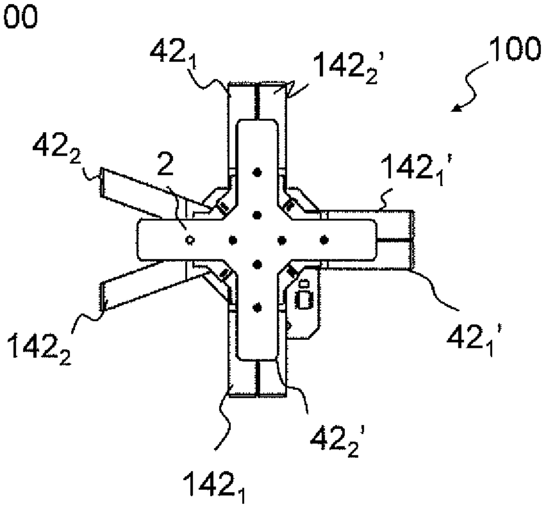
Figure 21A:
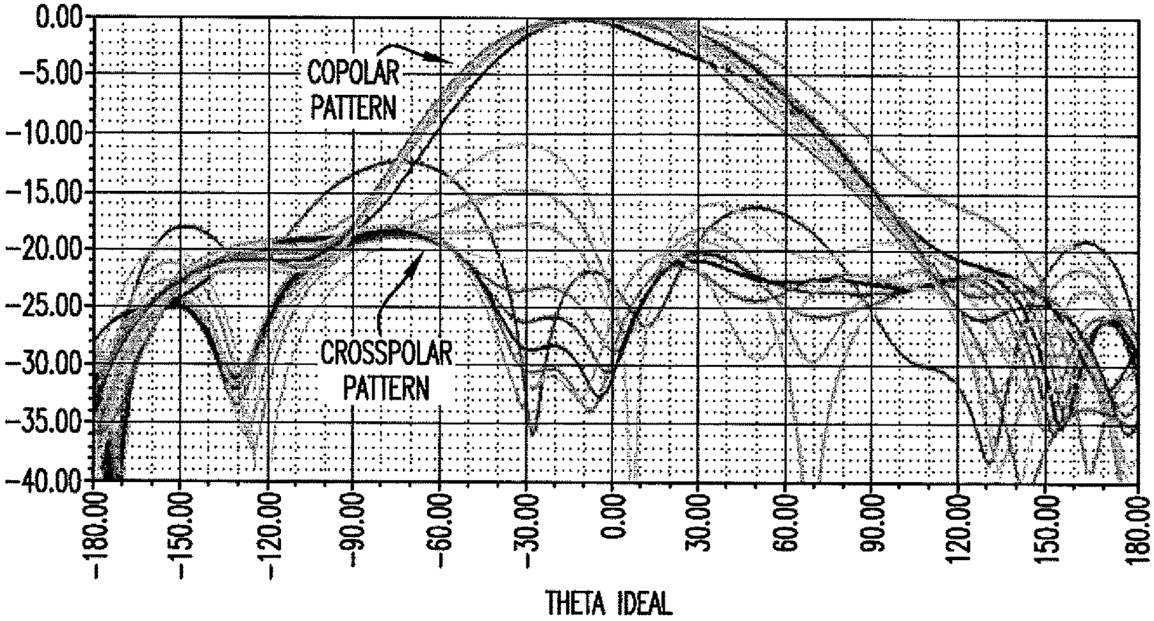
FIGS. 21A & 21B show results for an example of the subject matter described herein.

The results include plots of the gain of a co-polar component of electric field and the gain of a cross-polar component of electric field against azimuthal angle, at boresight (FIG. 8A, 10A, 12A, 14A, 21A). The Cross Polar Discrimination can be measured as the co-polar gain (dB) minus the cross-polar gain (dB). FIG. 8A provides results for the dual-polarized antenna 100 illustrated in FIGS. 7A & 7B. There are similar results for the dual-polarized antenna 100 illustrated in FIGS. 6A & 6B. FIG. 10A provides results for the dual-polarized antenna 100 illustrated in FIG. 9A to 9D. FIG. 12A provides results for the dual-polarized antenna 100 illustrated in FIG. 11A to 11D. FIG. 14A provides results for the dual-polarized antenna 100 illustrated in FIG. 13A to 13D. FIG. 21A provides results for the dual-polarized antenna 100 illustrated in FIG. 20A to 20B.

Figure 10B:
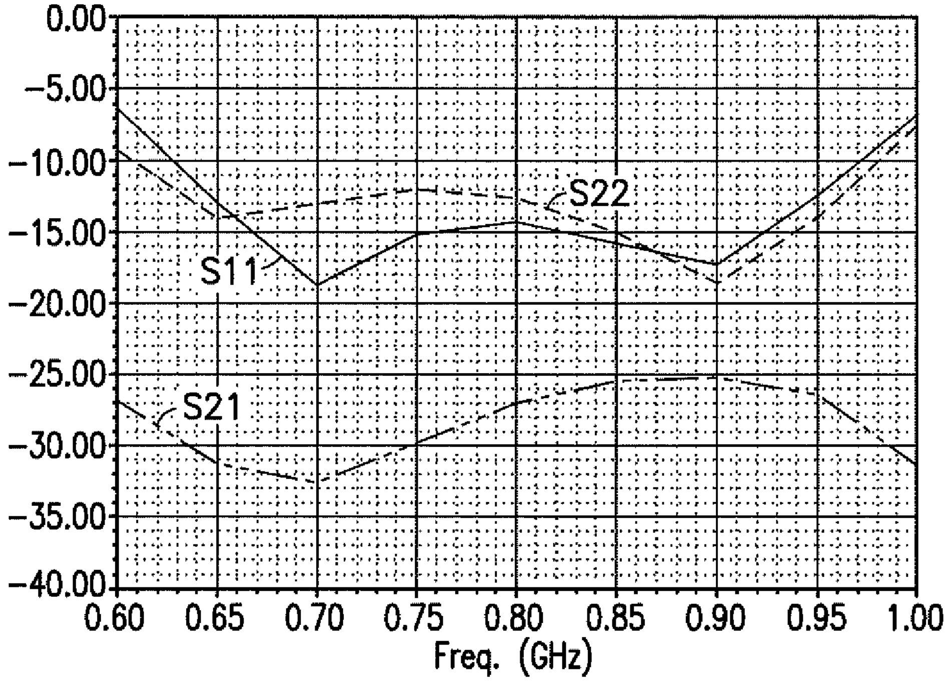
Figure 12B:
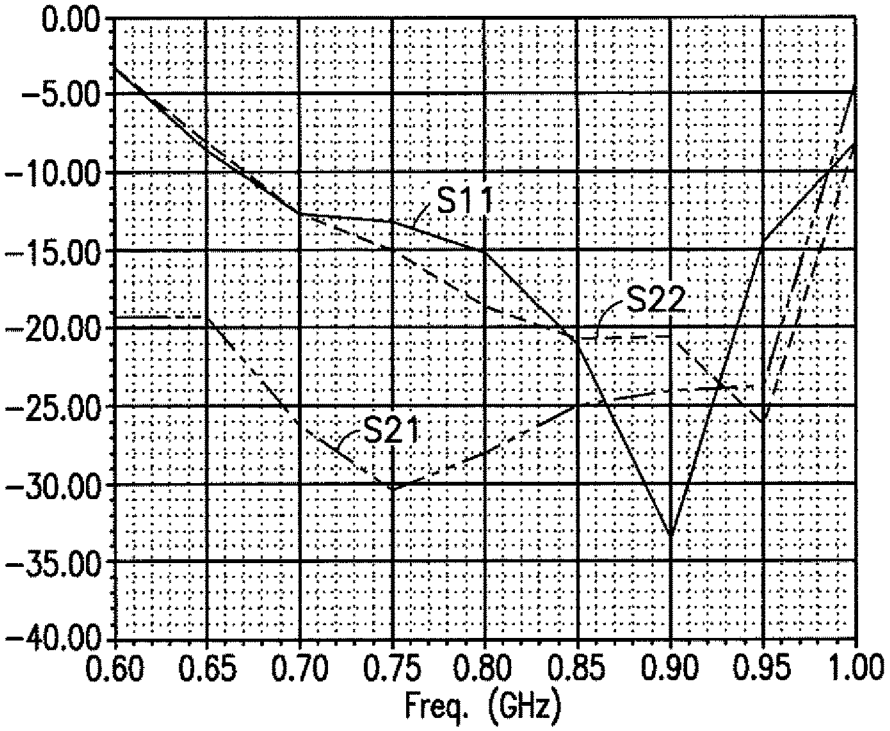
Figure 14B:
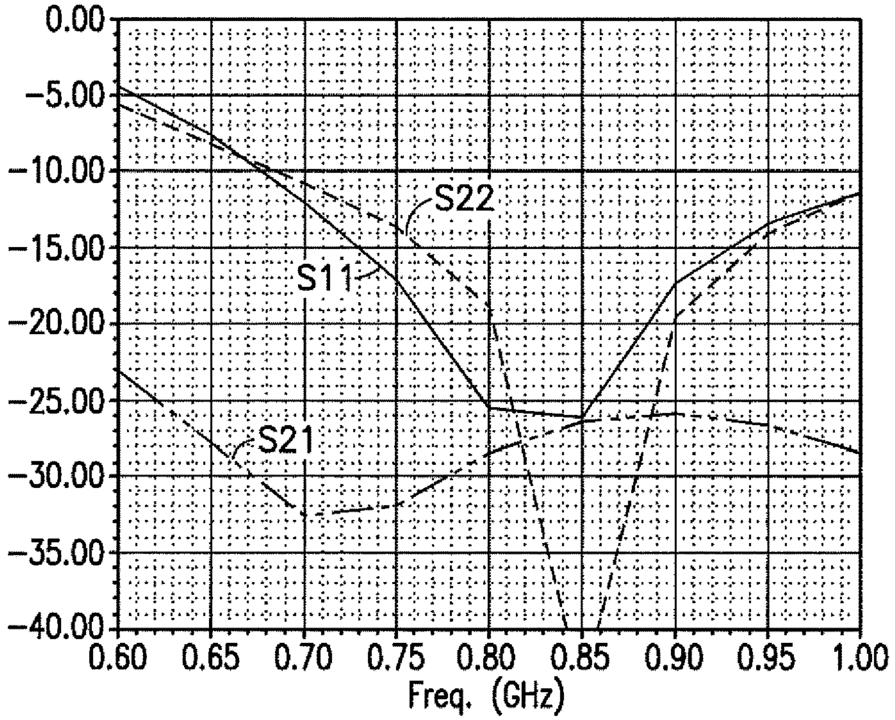
Figure 21B:
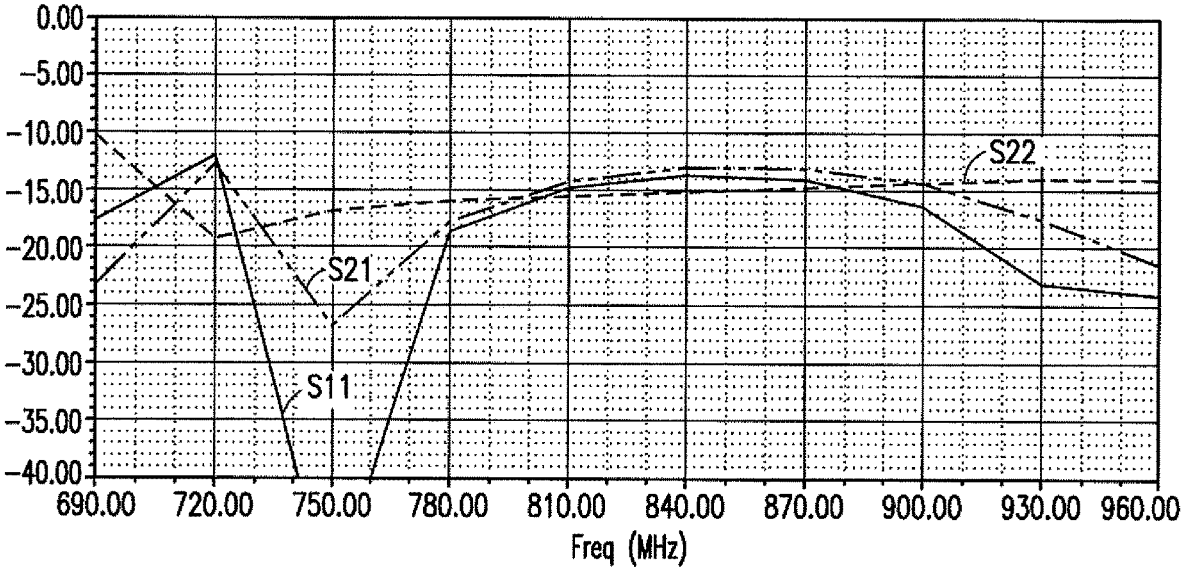

The results include plots of the scattering (S) parameters for the dual-polarized antenna 100 (FIG. 8B, 10B, 12B, 14B, 21B). The scattering parameters describe the input-out relationship between ports. S11 measures input port reflection. S22 is for output port reflection. S12 is for transmission gain and S21 is for reception gain. A requirement for an antenna is that it is frequency selective. S11, S22 have a low value in the operational frequency range of the antenna. FIG. 8B provides results for the dual-polarized antenna 100 illustrated in FIGS. 7A & 7B. There are similar results for the dual-polarized antenna 100 illustrated in FIGS. 6A & 6B. FIG. 10B provides results for the dual-polarized antenna 100 illustrated in FIG. 9A to 9D. FIG. 12B provides results for the dual-polarized antenna 100 illustrated in FIG. 11A to 11D. FIG. 14B provides results for the dual-polarized antenna 100 illustrated in FIG. 13A to 13D. FIG. 21B provides results for the dual-polarized antenna 100 illustrated in FIG. 20A to 20B.

This disclosure including the description and drawings describes examples of a new dipole antenna. The new dipole antenna is referenced using references 20, 120. The new dipole antenna 20 has a feed 30 and the new dipole antenna 130 has a feed 130.

The new dipole antenna is configured for operation with a particular polarization. The new dipole antenna comprises a feed; and a pair of conductive elements fed by the feed, wherein the pair of conductive elements are grounded, and extend in parallel on opposing sides of the feed and then diverge.

In the description a dipole antenna has a pair of notional poles or arms 40 used to provide a particular orientation of polarization. The pair of poles or arms can be referenced individually or collectively using a reference 40, 140 and poles or arms in a pair can be distinguished by the reference with a subscript. The dipole antenna 20 has poles or arms $\mathbf{40}_1$, $\mathbf{40}_2$. The dipole antenna 120 has poles or arms $\mathbf{140}_1$, $\mathbf{140}_2$.

The new dipole antenna has at least one notional pole or arm comprising a pair of conductive elements fed by the feed, wherein the pair of conductive elements are grounded, and extend in parallel on opposing sides of the feed and then diverge. A pair of conductive elements can be referenced individually or collectively using a reference 42, 42', 142, 142' and conductive elements in a pair can be distinguished by the reference with a subscript. The dipole antenna 20 can have conductive elements $\mathbf{42}_1$, $\mathbf{42}_2$ providing the notional pole or arm $\mathbf{40}_1$. The dipole antenna 20 can have conductive elements $\mathbf{42}_1'$, $\mathbf{42}_2'$ providing the notional pole or arm $\mathbf{40}_2$. The dipole antenna 120 can have conductive elements $\mathbf{142}_1$, $\mathbf{142}_2$ providing the notional pole or arm $\mathbf{140}_1$. The dipole antenna 120 can have conductive elements $\mathbf{142}_1'$, $\mathbf{142}_2'$ providing the notional pole or arm $\mathbf{140}_2$.

The conductive elements $\mathbf{42}_1$, $\mathbf{42}_2$ have extremities $\mathbf{44}_1$, $\mathbf{44}_2$. The conductive elements $\mathbf{42}_1'$, $\mathbf{42}_2'$ have extremities $\mathbf{44}_1'$, $\mathbf{44}_2'$. The conductive elements $\mathbf{142}_1$, $\mathbf{142}_2$ have extremities $\mathbf{144}_1$, $\mathbf{144}_2$. The conductive elements $\mathbf{142}_1'$, $\mathbf{142}_2'$ have extremities $\mathbf{144}_1'$, $\mathbf{144}_2'$.

Figure 3:
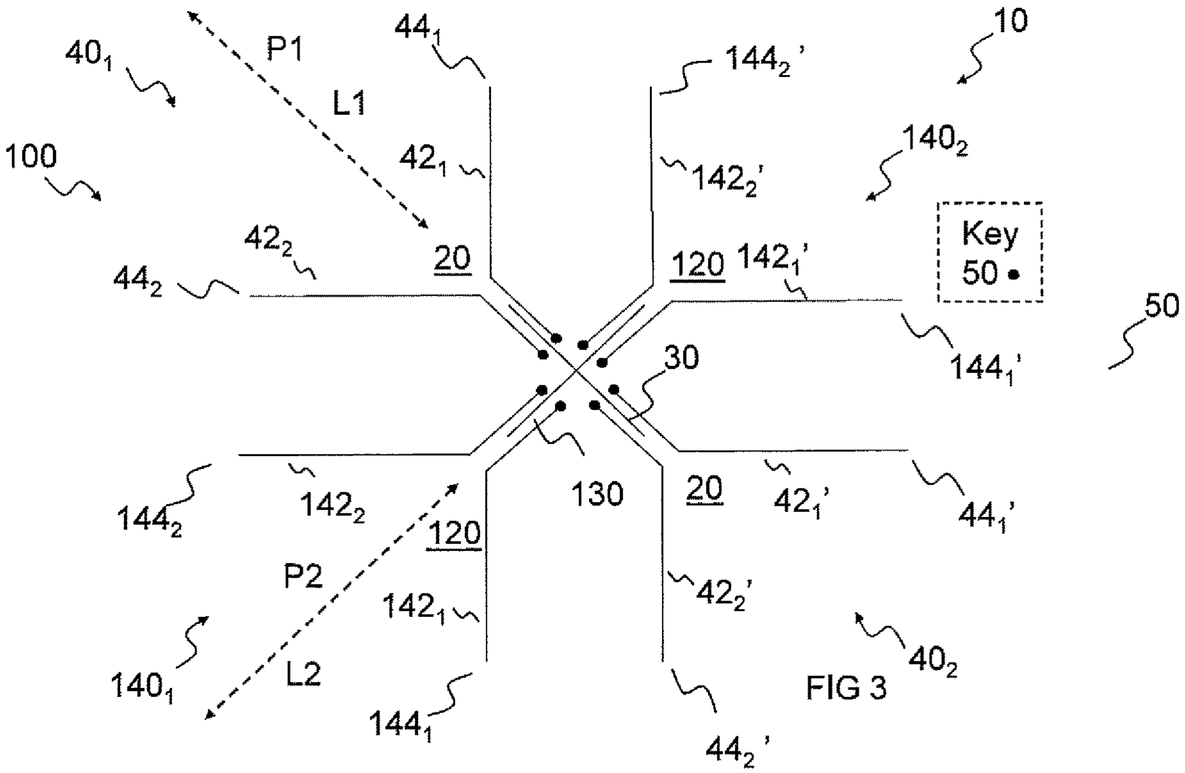
FIG. 3 shows another example of the subject matter described herein.
Figure 4:
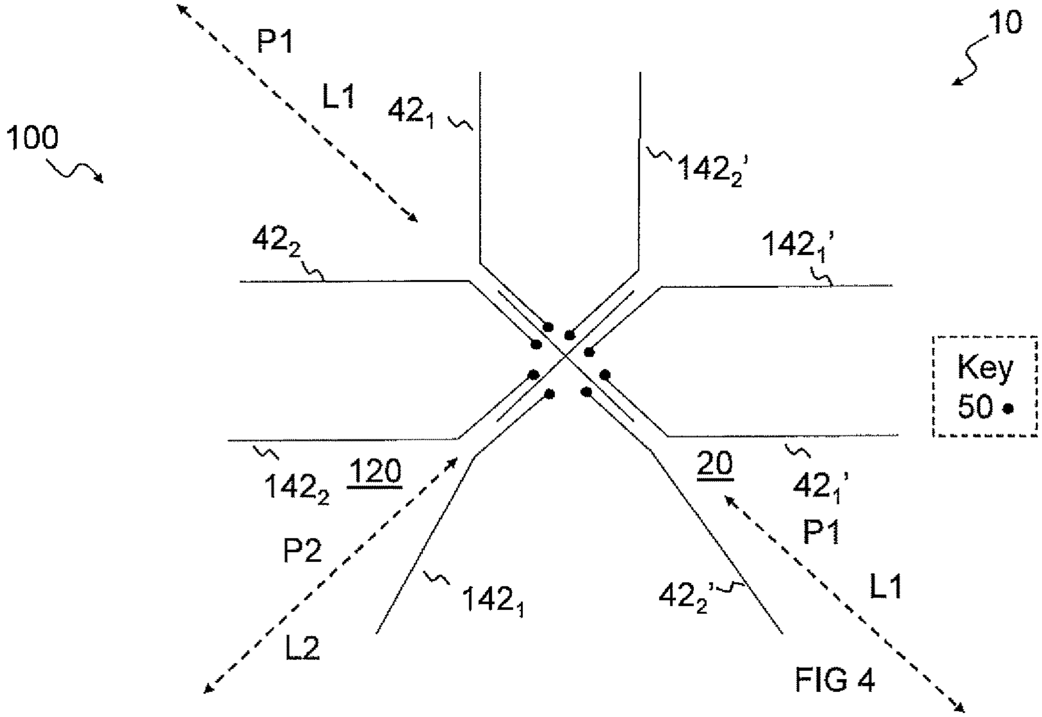
FIG. 4 shows another example of the subject matter described herein.

Each of the conductive elements 42, 142 is grounded at a ground 50. The ground 50 is indicated by a black dot in FIGS. 1 to 4 but every ground point is not labelled in all FIGs for clarity. In FIGS. 3 & 4, black dots are associated with label 50 via a key (an inset that explains the symbols).

The FIGS. 1 to 4 are fully labelled. Other FIGs are not fully labelled for purposes of clarity. The features labelled in FIGS. 1 to 4 can be present in the other FIGs even if not labelled.

In some examples, the apparatus 10 comprises: a dipole antenna 20, configured for operation with a first polarization P1, the dipole antenna 20 comprising: a feed 30; and a pair of conductive elements 42 fed by the feed 30, wherein the pair of conductive elements 42 are grounded 50, and extend in parallel on opposing sides of the feed 30 and then diverge.

In some examples, the apparatus 10 comprises: a dipole antenna 20, configured for operation with a first polarization P1, the dipole antenna 20 comprising: a feed 30; and a pair of conductive elements 42' fed by the feed 30, wherein the pair of conductive elements 42' are grounded 50, and extend in parallel on opposing sides of the feed 30 and then diverge.

In some examples, the apparatus 10 comprises: a dipole antenna 120, configured for operation with a second polarization P2, the dipole antenna 120 comprising: a feed 130; and a pair of conductive elements 142 fed by the feed 130, wherein the pair of conductive elements 142 are grounded 50, and extend in parallel on opposing sides of the feed 130 and then diverge.

In some examples, the apparatus 10 comprises: a dipole antenna 120, configured for operation with a second polarization P2, the dipole antenna 120 comprising: a feed 130; and a pair of conductive elements 142' fed by the feed 130, wherein the pair of conductive elements 142' are grounded 50, and extend in parallel on opposing sides of the feed 130 and then diverge.

In at least some examples, the polarizations P1 and P2 are orthogonal.

In some FIGs a director 2 (also called a patch) is present. It is a conductor that can be optionally used for impedance matching.

In some examples, the pair of conductive elements 42, 42' where fed, sandwich the feed 30 and then diverge to provide separated respective radiator elements $\mathbf{42}_1$, $\mathbf{42}_2$; $\mathbf{42}_1'$, $\mathbf{42}_2'$. In some examples, the pair of conductive elements 142, 142' where fed, sandwich the feed 130 and then diverge to provide separated respective radiator elements $\mathbf{142}_1$, $\mathbf{142}_2$; $\mathbf{142}_1'$, $\mathbf{142}_2'$.

The pair of conductive elements 42, 42'; 142, 142', at the feed 30, 130, are separated from the feed 30, 130 by dielectric or a dielectric. The dielectric could be any suitable non-conductive material including air, or a combination of different non-conductive material, including air.

In at least some examples, the pair of conductive elements 42, 42', 142, 142', at the feed 30, 130, are wider than the feed 30, 130 and form a stripline arrangement. The pair of conductive elements 42, 42', 142, 142', at the feed 30, 130, form a transmission line. The transmission line can, in some examples, have a uniform cross-section along its length. The feed 30, 130 can be centrally located in the cross-section along its length.

The pair of conductive elements 42, 42', 142, 142', at the feed 30, 130, increase the conducting surface and provide good radiating performance. The pair of conductive elements 42, 42', 142, 142', at the feed 30, 130, shield the central feed 30, 130 from external electric fields.

In some but not necessarily all examples a first printed wiring board provides the first dipole feed 30. The first printed wiring board can, in some examples be planar and stiff and extend substantially perpendicularly from a planar ground plane.

In some but not necessarily all examples a second printed wiring board provides the second dipole feed 130. The second printed wiring board can, in some examples be planar and stiff and extend substantially perpendicularly from the planar ground plane.

In some but not necessarily all examples the first printed wiring board and the second printed wiring board intersect to form a cross in a cross-section parallel to the ground plane. In some but not necessarily all examples the first printed wiring board and the second printed wiring board are orthogonal and form a regular cross shape in a cross-section parallel to the ground plane.

In the examples illustrated, conductive elements 42, 42', 142, 142' are in order: grounded 50; parallel adjacent a feed 30, 130; diverging; then reaching respective extremities 44, 44', 144, 144'.

FIG. 1 shows an example of a dipole antenna 20 comprising a pair of grounded conductive elements 42 that extend in parallel on opposing sides of the feed 30 and then diverge.

The apparatus 10 comprises: a dipole antenna 20, configured for operation with a first polarization P1, the dipole antenna 20 comprising: a feed 30; and a pair of conductive elements 42 fed by the feed 30, wherein the pair of conductive elements 42 are grounded 50, and extend in parallel on opposing sides of the feed 30 and then diverge.

The dipole antenna 20 comprises a pair of dipole poles or arms 40 configured for the first polarization P1. One of the dipole arms $\mathbf{40}_1$ comprises the pair of conductive elements 42.

The pair of conductive elements 42, where parallel, are parallel to a virtual line L1 aligned with the first polarization P1 and then diverge from that virtual line L1.

In this example but not necessarily all examples, the pair of conductive elements 42 diverge symmetrically from a virtual line L1 aligned with the first polarization P1.

In this example but not necessarily all examples, the pair of conductive elements 42, at least where they diverge, have reflection symmetry in a virtual line L1 aligned with the first polarization P1.

In this example but not necessarily all examples one of the pair of conductive elements $\mathbf{42}_1$ extends substantially in a first direction to an extremity $\mathbf{44}_1$ and the other of the pair of conductive elements $\mathbf{42}_2$ extends substantially in a second direction towards an extremity $\mathbf{44}_2$, wherein the second direction is orthogonal to the first direction.

Figure 2:
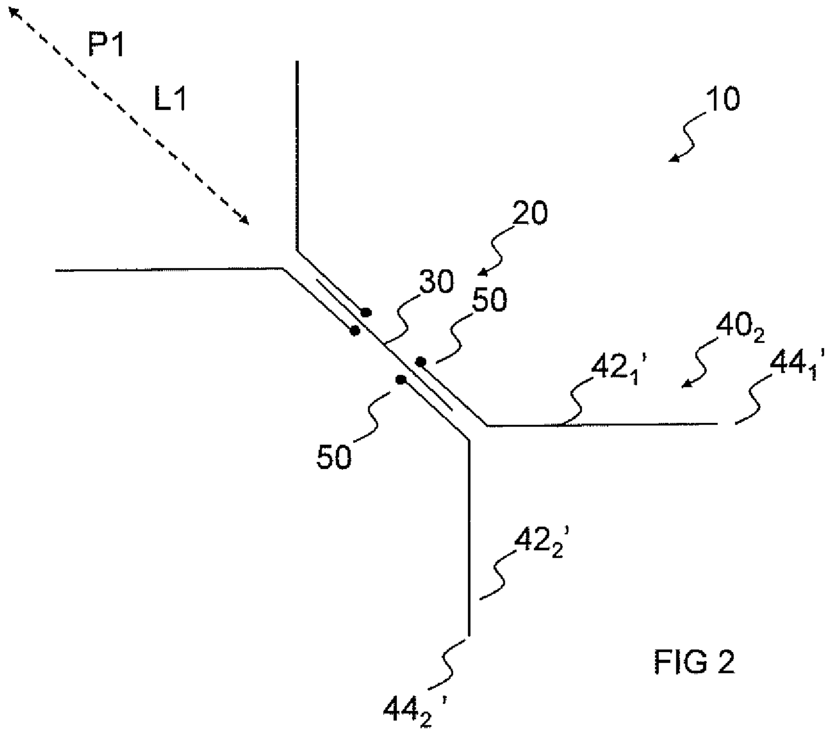
FIG. 2 shows another example of the subject matter described herein.

FIG. 2 shows another example of a dipole antenna 20.

The apparatus 10 comprises: a dipole antenna 20, configured for operation with a first polarization P1.

The dipole antenna 20 comprises: a feed 30; a pair of conductive elements 42 fed by the feed 30, wherein the pair of conductive elements 42 are grounded 50, and extend in parallel on opposing sides of the feed 30 and then diverge; and a pair of conductive elements 42' fed by the feed 30, wherein the pair of conductive elements 42 are grounded 50, and extend in parallel on opposing sides of the feed 30 and then diverge.

The dipole antenna 20 comprises a pair of dipole poles or arms 40 configured for the first polarization P1. One of the dipole arms $\mathbf{40}_1$ comprises the pair of conductive elements 42 and the other dipole arm $\mathbf{40}_2$ comprises the pair of conductive elements 42'.

In this example, the pair of conductive elements 42, where parallel, are parallel to a virtual line L1 aligned with the first polarization P1 and then diverge from that virtual line L1. In this example but not necessarily all examples, the pair of conductive elements 42 diverge symmetrically from the virtual line L1 aligned with the first polarization P1. In this example but not necessarily all examples, the pair of conductive elements 42, at least where they diverge, have reflection symmetry in a virtual line L1 aligned with the first polarization P1. In this example but not necessarily all examples one of the pair of conductive elements $\mathbf{42}_1$ extends substantially in a first direction to an extremity $\mathbf{44}_1$ and the other of the pair of conductive elements $\mathbf{42}_2$ extends substantially in a second direction towards an extremity $\mathbf{44}_2$, wherein the second direction is orthogonal to the first direction.

The pair of conductive elements 42', where parallel, are parallel to the virtual line L1 aligned with the first polarization P1 and then diverge from that virtual line L1. In this example but not necessarily all examples, the pair of conductive elements 42' diverge symmetrically from the virtual line L1 aligned with the first polarization P1. In this example but not necessarily all examples, the pair of conductive elements 42', at least where they diverge, have reflection symmetry in a virtual line L1 aligned with the first polarization P1. In this example but not necessarily all examples one of the pair of conductive elements $\mathbf{42}_2'$ extends substantially in a direction to an extremity $\mathbf{44}_1'$ and the other of the pair of conductive elements $\mathbf{42}_2'$ extends substantially in an orthogonal direction towards an extremity $\mathbf{44}_2'$.

In this example but not necessarily all examples, the pair of conductive elements 42 and the pair of conductive elements 42' diverge symmetrically by the same amount. In this example but not necessarily all examples one of the pair of conductive elements $\mathbf{42}_2'$ extends substantially in a direction opposite the first direction to the extremity $\mathbf{44}_2'$ and the other of the pair of conductive elements $\mathbf{42}_1'$ extends substantially in a direction opposite the second direction towards the extremity $\mathbf{44}_1'$.

FIG. 3 shows an example of a dual-polarized antenna 100 comprising the dipole antenna 20 illustrated in FIG. 3 and another dipole antenna 120.

The description of the dipole antenna 20 provided for FIG. 2 is also relevant for FIG. 3. It is not repeated for brevity but is incorporated by reference.

The apparatus 10 comprises: a dipole antenna 120, configured for operation with a second polarization P2.

In this example, the second polarization is orthogonal (substantially orthogonal) to the first polarization P1.

The dipole antenna 120 comprises: a feed 130; a pair of conductive elements 142 fed by the feed 130, wherein the pair of conductive elements 142 are grounded 50, and extend in parallel on opposing sides of the feed 130 and then diverge; and a pair of conductive elements 142' fed by the feed 130, wherein the pair of conductive elements 142 are grounded 50, and extend in parallel on opposing sides of the feed 130 and then diverge.

The dipole antenna 120 comprises a pair of poles or arms 140 configured for the second polarization P2. One of the dipole arms $\mathbf{140}_1$ comprises the pair of conductive elements 142 and the other dipole arm $\mathbf{140}_2$ comprises the pair of conductive elements 142'.

In this example, the pair of conductive elements 142, where parallel, are parallel to a virtual line L2 aligned with the second polarization P2 and then diverge from that virtual line L2. In this example but not necessarily all examples, the pair of conductive elements 142 diverge symmetrically from the virtual line L2 aligned with the second polarization P2. In this example but not necessarily all examples, the pair of conductive elements 142, at least where they diverge, have reflection symmetry in the virtual line L2 aligned with the second polarization P2. In this example but not necessarily all examples one of the pair of conductive elements $\mathbf{142}_1$ extends substantially in a direction to an extremity $\mathbf{144}_1$ and the other of the pair of conductive elements $\mathbf{142}_2$ extends substantially in an orthogonal direction towards an extremity $\mathbf{144}_2$.

In this example, the pair of conductive elements 142', where parallel, are parallel to the virtual line L2 and then diverge from that virtual line L2. In this example but not necessarily all examples, the pair of conductive elements 142' diverge symmetrically from the virtual line L2. In this example but not necessarily all examples, the pair of conductive elements 142', at least where they diverge, have reflection symmetry in the virtual line L2. In this example but not necessarily all examples one of the pair of conductive elements $\mathbf{142}_2'$ extends substantially in a direction to an extremity $\mathbf{144}_1'$ and the other of the pair of conductive elements $\mathbf{142}_2'$ extends substantially in an orthogonal direction towards an extremity $\mathbf{144}_2'$.

In this example but not necessarily all examples, the pair of conductive elements 142 and the pair of conductive elements 142' diverge symmetrically by the same amount.

In this example but not necessarily all examples one of the pair of conductive elements $142_1$ extends substantially in a direction opposite the first direction (parallel to conductive element $42_2$') to the extremity $144_1$ and the other of the pair of conductive elements $142_2$ extends substantially in the second direction (parallel to conductive elements $42_2$) towards the extremity $144_2$.

In this example but not necessarily all examples one of the pair of conductive elements $142_2$' extends substantially in the first direction (parallel to conductive element $42_1$) to the extremity $144_2$' and the other of the pair of conductive elements $142_1$' extends substantially in a direction opposite the second direction (parallel to conductive elements $42_1$') towards the extremity $144_1$'.

FIG. 4 shows another example of a dual-polarized antenna 100 comprising a dipole antenna 20 and a dipole antenna 120.

The description of the dipole antenna 20 provided for FIG. 2 is in part relevant for FIG. 4. It is not repeated for brevity but is incorporated by reference. The description of the dipole antenna 120 provided for FIG. 3 is in part relevant for FIG. 4. It is not repeated for brevity but is incorporated by reference. The dipole antenna 20 illustrated in FIG. 4 differs from the dipole antenna 20 illustrated in FIG. 3 in that the conductive element $42_2$' of the dipole antenna 20 does not diverge symmetrically from virtual line L1 when compared to conductive element $42_1$' of the dipole antenna 20. The dipole antenna 120 illustrated in FIG. 4 differs from the dipole antenna 120 illustrated in FIG. 3 in that the conductive element $142_1$ of the dipole antenna 120 does not diverge symmetrically from virtual line L2 when compared to conductive element $142_2$ of the dipole antenna 120.

Whereas, in FIG. 3, the conductive element $42_2$' of the dipole antenna 20 and the conductive element $142_1$ of the dipole antenna 120 are parallel, in FIG. 4, they are not parallel and are splayed.

Figure 5A:
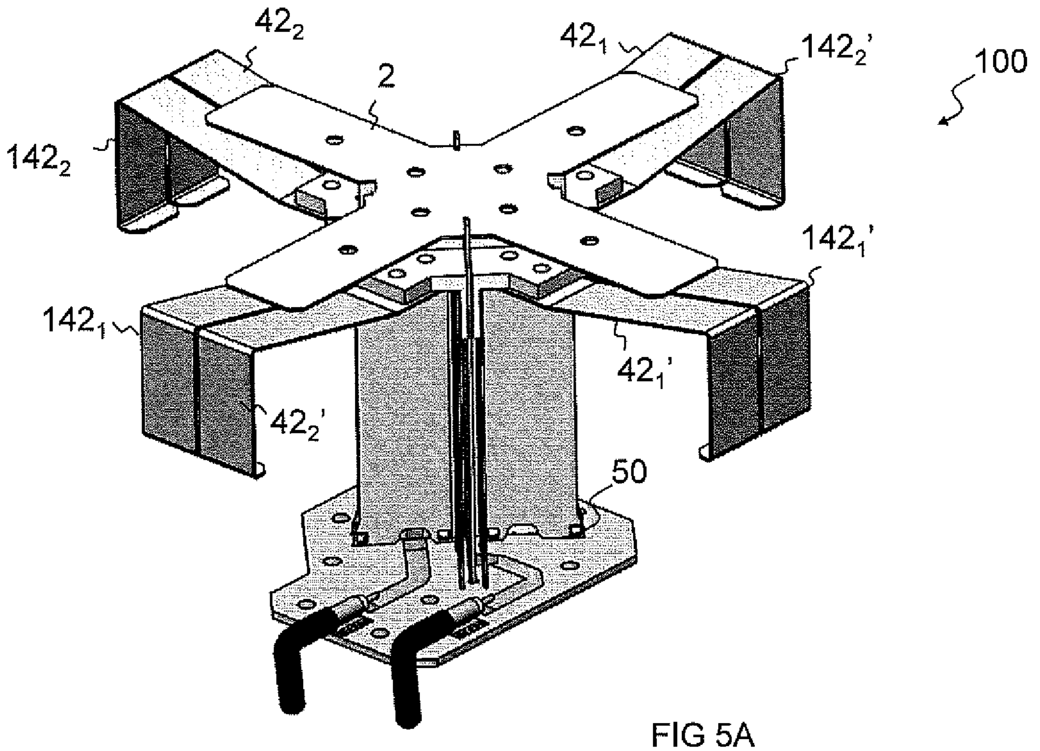
FIGS. 5A & 5B show another example of the subject matter described herein.
Figure 5B:
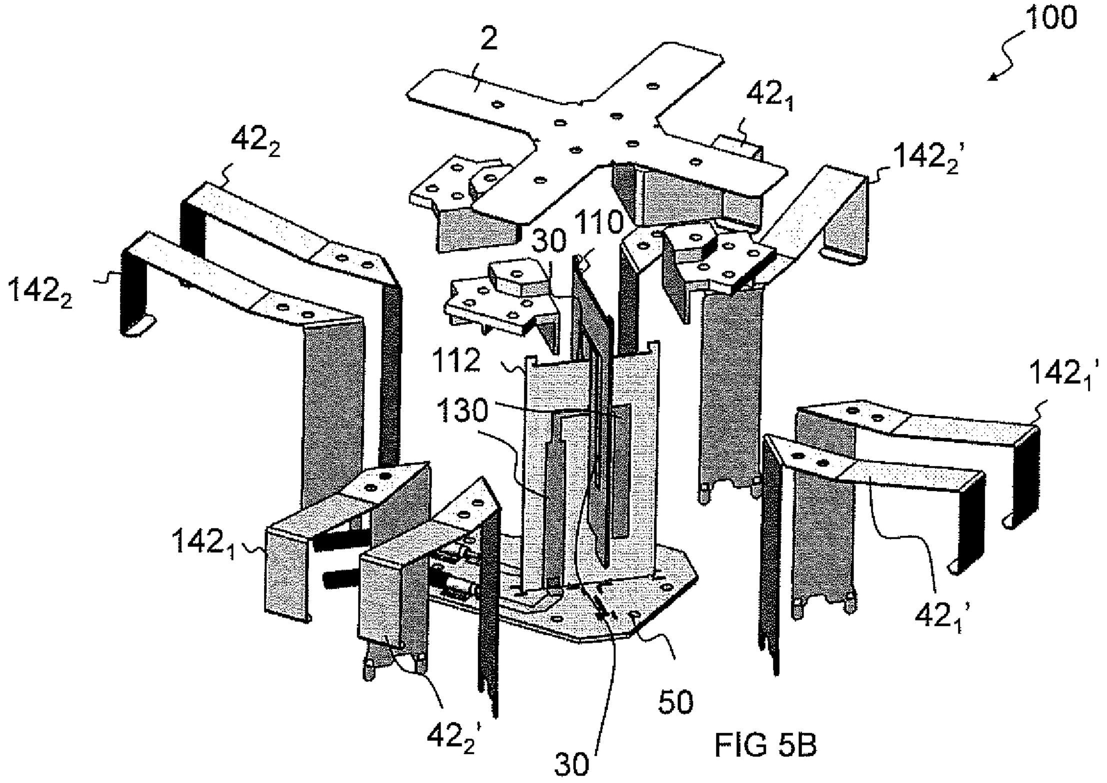

FIG. 5A shows another example of a dual-polarized antenna 100 comprising a dipole antenna 20 and a dipole antenna 120. The dual-polarized antenna 100 is similar to the dual polarized antenna 100 illustrated in FIG. 3. FIG. 5B shows a notionally exploded view of the dual-polarized antenna 100 illustrated in FIG. 5A.

In this example, a first printed wiring board 110 provides the first dipole feed 30. The first printed wiring board 110 is planar and stiff and extends substantially perpendicularly from a planar ground plane 50. Conductive traces on or within the first printed wiring board 110 provide the feed 30.

In this example, a second printed wiring board 112 provides the second dipole feed 130. The second printed wiring board 112 is planar and stiff and extends substantially perpendicularly from a planar ground plane 50. Conductive traces on or within the second printed wiring board 120 provide the feed 130.

In this example, the first printed wiring board 110 and the second printed wiring board 112 intersect at right-angles to form a cross.

Each of the conductive elements $42_1$, $42_2$, $42_1$', $42_2$', $142_1$, $142_2$, $142_1$', $142_2$' comprises an L-shaped portion. One limb of the L extends from the ground plane 50 where it is grounded, past the feed 30, 130 to a vertex of the L. The other limb of the L extends from the vertex to a respective extremity $44_1$, $44_2$, $44_1$', $44_2$', $144_1$, $144_2$, $144_1$', $144_2$'.

The pairs of vertical limbs (the limbs which extend from the ground plane 50) of the L-shaped conductive elements of the same pole or arm of the same dipole antenna form a transmission line. The conductive elements $42_1$, $42_2$ are one pair that shield the feed 30. The conductive elements $42_1$', $42_2$' are another pair that shield the feed 30. The conductive elements $142_1$, $142_2$ are a pair that shield the feed 130. The conductive elements $142_1$', $142_2$' are another pair that shield the feed 130.

Figure 6A:
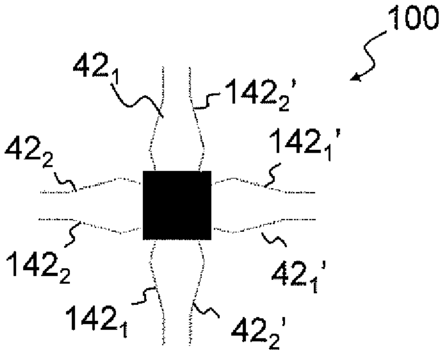
FIGS. 6A & 6B show another example of the subject matter described herein.
Figure 6B:
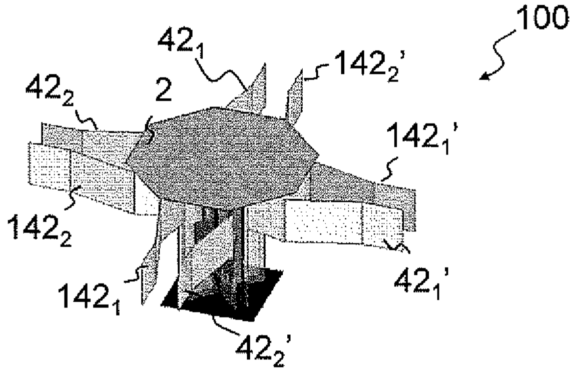

FIGS. 6A & 6B show an example of the dual polarized antenna 100. FIG. 6A is a top plan view and FIG. 6B is a perspective view. The pairs of conductive elements diverge, then bend outwardly to diverge more than bend inwardly to diverge less and extend at right angles to each other.

Figure 7A:
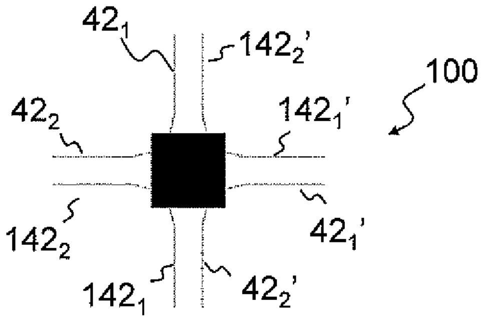
FIGS. 7A & 7B show another example of the subject matter described herein.
Figure 7B:
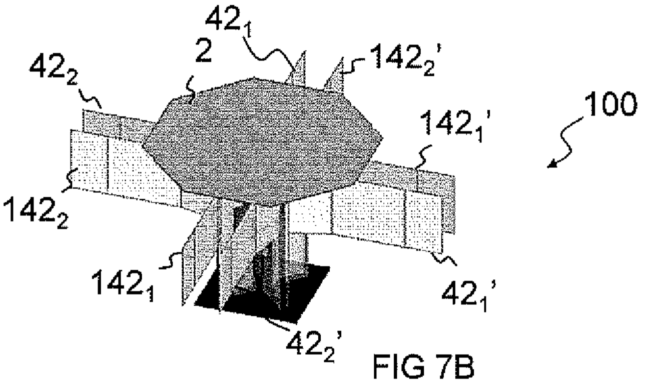

FIGS. 7A & 7B show an example of the dual polarized antenna 100. FIG. 7A is a top plan view and FIG. 7B is a perspective view. The pairs of conductive elements diverge then bend inwardly to diverge less and extend at right angles to each other.

The bends in FIGS. 6A, 6B, 7A, 7B are in-plane bends. The bends are in a plane that is parallel to the ground plane (orthogonal to boresight).

Each of the pairs of conductive elements 42, 42', diverge via one or more pairs of correspondingly opposite bends measured relative to the virtual line L1/first polarization direction P1 (not illustrated). Each of the pairs of conductive elements 142, 142', diverge via one or more pairs of correspondingly opposite bends measured relative to the virtual line L2/second polarization direction P2 (not illustrated).

Each bend in a conductive element before an extremity of the conductive element defines a bearing, and a sum of said one or more bearings for one of the pair of conductive elements and a sum of said one or more bearings for the other one of the pair of conductive elements are different by substantially 90 degrees.

FIG. 9A, 9B, 9C, 9D show an example of the dual polarized antenna 100. FIG. 9A is a perspective view with a director 2 attached. FIG. 9B is a top plan view without the director. FIGS. 9C and 9D are different perspective views without the director. In this example, the conductive elements 42, 42', 142, 142' have out-of-plane bends. The bends are out of a plane that is parallel to the ground plane (orthogonal to boresight). The conductive elements 42, 42', 142, 142' have bends towards the ground plane. In other examples some but not all of the conductive elements 42 have such bends. In some examples, some or all of conductive elements 42, 42', 142, 142' have bends away from a ground plane.

FIG. 11A, 11B, 11C, 11D show an example of the dual polarized antenna 100. FIG. 11A is a perspective view with a director 2 attached. FIG. 11B is a top plan view without the director. FIGS. 11C and 11D are different perspective views without the director. In this example, conductive elements 42, 42', 142, 142' that belong to adjacent pairs are interconnected.

The extremity 44, of the conductive element $42_1$ is interconnected to the extremity $144_2$' of the conductive element $142_2$'.

The extremity $144_1$' of the conductive element $142_1$' is interconnected to the extremity $44_1$' of the conductive element $42_1$'.

The extremity $44_2$' of the conductive element $42_2$' is interconnected to the extremity $144_1$ of the conductive element $142_1$.

The extremity $144_2$ of the conductive element $142_2$ is interconnected to the extremity $44_2$ of the conductive element $42_2$.

FIG. 13A, 13B, 13C, 13D show an example of the dual polarized antenna 100. FIG. 13A is a perspective view with a director 2 attached. FIG. 13B is a top plan view without the director. FIG. 13C perspective view without the director. FIG. 13D is an enlargement of part of FIG. 13C. In this example, conductive elements 42, 42', 142, 142' that belong to adjacent pairs are interconnected.

This example illustrates that dimensions of the conductive elements 42, 42', 142, 142' can be varied. In this example, a depth of the conductive elements 42, 42', 142, 142' in the boresight direction is significantly less than a depth of the conductive elements 42, 42', 142, 142' in the example illustrated in FIGS. 11A to 11D, for example.

Figure 15:
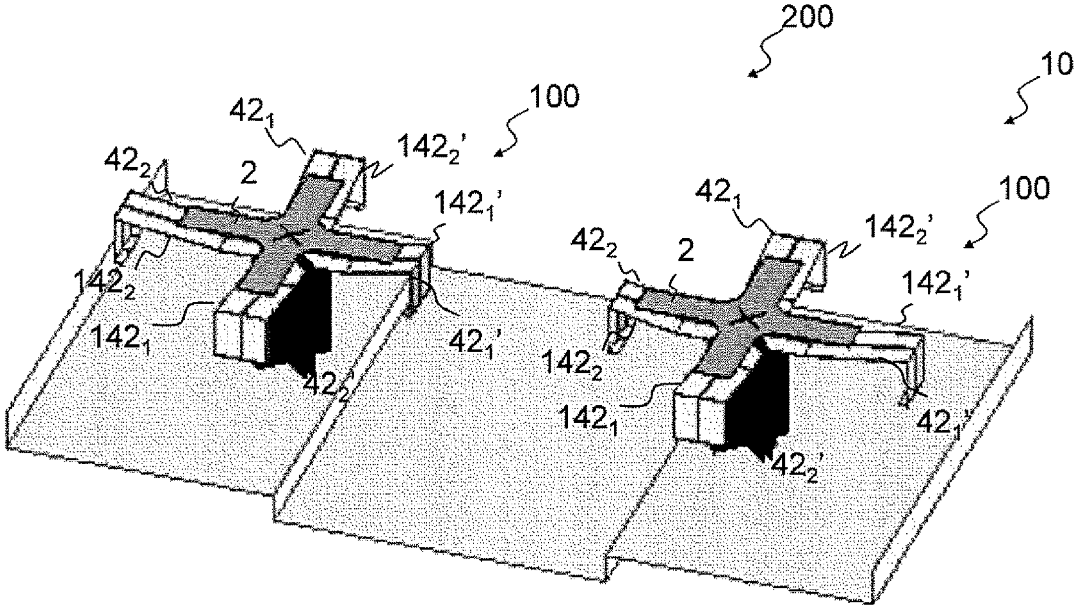
FIG. 15 shows another example of the subject matter described herein.

FIG. 15 shows another example in which the apparatus 10 comprises a first array 200 of the dual polarized antennas 100. In this example, the dual polarized antennas 100 of the array 200 are configured to operate at the same first operational frequency band.

The apparatus 10 can, for example, be a dual polarized antenna panel.

Figure 16A:
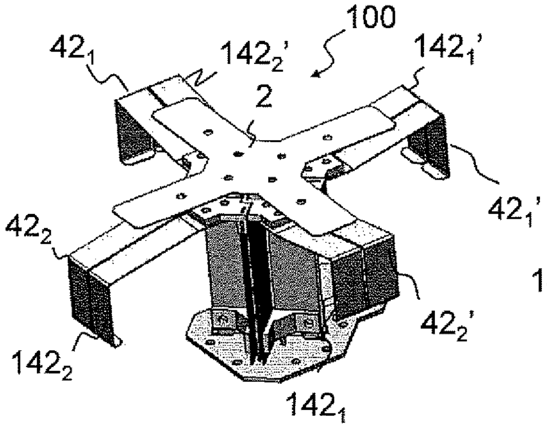
FIGS. 16A to 16C show another example of the subject matter described herein.
Figure 16B:
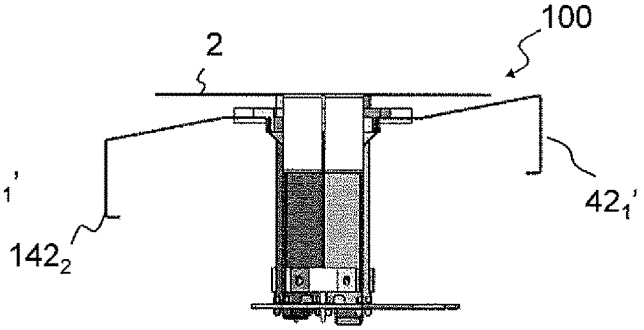
Figure 16C:
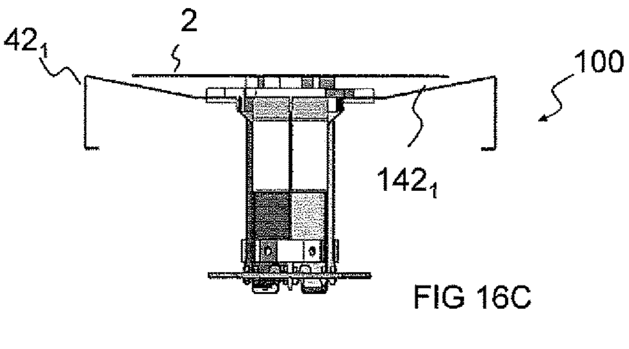

FIG. 16A, 16B, 16C show an example of the dual polarized antenna 100. FIG. 16A is a perspective view with a director 2 attached. FIG. 16B is a front view. FIG. 16C is a side view.

In this example, the dual polarized antenna 100 is asymmetric. The arrangement of conductive elements 42, 42', 142, 142' when viewed from the side is different than the arrangement of conductive elements 42, 42', 142, 142' when viewed from the front.

In this example, the conductive elements $\mathbf{42_2}$, and $\mathbf{142_2}$ have a different configuration than the conductive elements $\mathbf{42_1}$, $\mathbf{142_1}$, $\mathbf{42_1}'$, $\mathbf{42_2}'$, $\mathbf{142_1}'$, $\mathbf{142_2}'$.

In this example, the conductive elements $\mathbf{42_2}$, $\mathbf{142_1}$, $\mathbf{142_2}$, $\mathbf{42_1}'$, $\mathbf{42_2}'$, $\mathbf{142_1}'$ are asymmetric and bend towards or away from the ground plane by different amounts.

In this example, the conductive elements $\mathbf{42_2}$, and $\mathbf{142_2}$ are bent towards the ground plane (away from the director 2) and the conductive elements $\mathbf{42_1}$, $\mathbf{142_1}$, $\mathbf{42_1}'$, $\mathbf{42_2}'$, $\mathbf{142_1}'$, $\mathbf{142_2}'$ are bent away from the ground plane (towards the director 2).

Different arrangements and configurations of the conductive elements $\mathbf{42_1}$, $\mathbf{42_2}$, $\mathbf{142_1}$, $\mathbf{142_2}$, $\mathbf{42_1}'$, $\mathbf{42_2}'$, $\mathbf{142_1}'$, $\mathbf{142_2}'$ can be used to provide asymmetry. For example, some of the conductive elements $\mathbf{42_1}$, $\mathbf{142_1}$, $\mathbf{42_1}'$, $\mathbf{42_2}'$, $\mathbf{142_1}'$, $\mathbf{142_2}'$ can have different lengths.

Figure 17A:
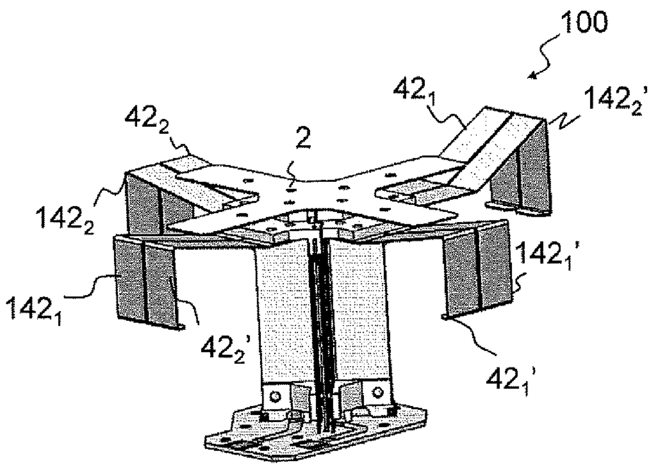
FIGS. 17A & 17B show another example of the subject matter described herein.
Figure 17B:
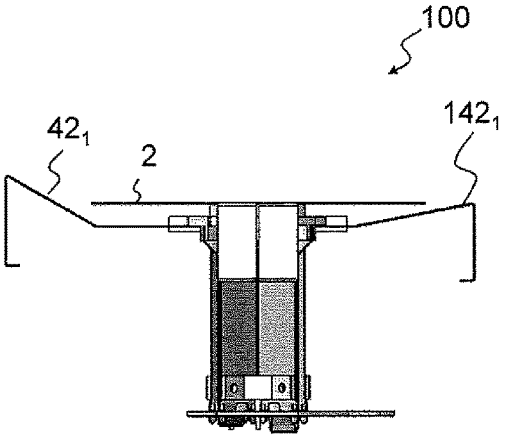

FIG. 17A, 17B show an example of the dual polarized antenna 100. FIG. 17A is a perspective view with a director 2 attached. FIG. 17B is a side view.

In this example, the dual polarized antenna 100 is asymmetric. The arrangement of conductive elements 42, 42', 142, 142' when viewed from the side is different than the arrangement of conductive elements 42, 42', 142, 142' when viewed from the front.

In this example, the conductive elements $\mathbf{42_1}$ and $\mathbf{142_2}'$ have a different configuration than the conductive elements $\mathbf{42_2}$, $\mathbf{142_1}$, $\mathbf{142_2}$, $\mathbf{42_1}'$, $\mathbf{42_2}'$, $\mathbf{142_1}'$.

In this example, the conductive elements $\mathbf{42_2}$, $\mathbf{142_1}$, $\mathbf{142_2}$, $\mathbf{42_1}'$, $\mathbf{42_2}'$, $\mathbf{142_1}'$ are asymmetric and bend towards or away from the ground plane by different amounts.

In this example, the conductive elements $\mathbf{42_1}$ and $\mathbf{142_2}'$ are bent away from the ground plane (towards the director 2) and the conductive elements $\mathbf{42_2}$, $\mathbf{142_1}$, $\mathbf{142_2}$, $\mathbf{42_1}'$, $\mathbf{42_2}'$, $\mathbf{142_1}'$ are bent towards the ground plane (away from the director 2).

Different arrangements and configurations of the conductive elements $\mathbf{42_1}$, $\mathbf{42_2}$, $\mathbf{142_1}$, $\mathbf{142_2}$, $\mathbf{42_1}'$, $\mathbf{42_2}'$, $\mathbf{142_1}'$, $\mathbf{142_2}'$ can be used to provide asymmetry. For example, some of the conductive elements $\mathbf{42_1}$, $\mathbf{142_1}$, $\mathbf{42_1}'$, $\mathbf{42_2}'$, $\mathbf{142_1}'$, $\mathbf{142_2}'$ have different lengths.

An asymmetric topology of conductive elements $\mathbf{42_1}$, $\mathbf{142_1}$, $\mathbf{42_1}'$, $\mathbf{42_2}'$, $\mathbf{142_1}'$, $\mathbf{142_2}'$ can, for example be used to maintain antenna properties over the full base station vertical tilt (generally in a 2-12° tilt range). The asymmetry created in the vertical plane generates a natural tilt and avoids pattern discrepancies. Vertical and horizontal asymmetries can be combined depending on the antenna configuration.

Figure 18:
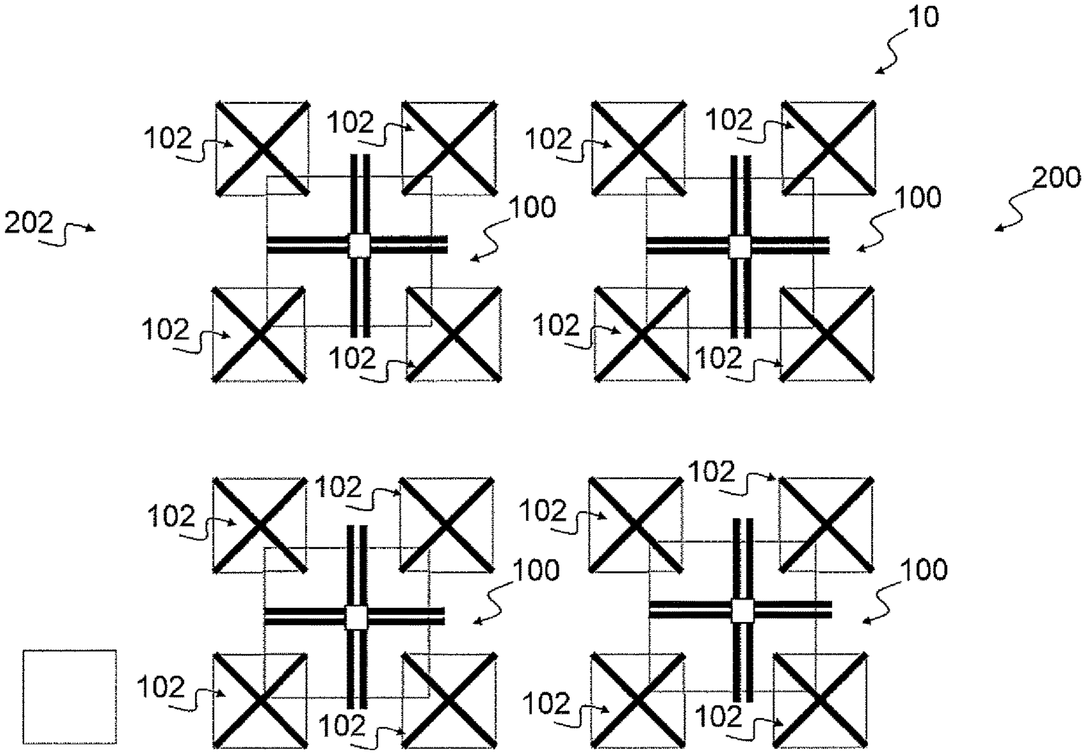
FIG. 18 shows another example of the subject matter described herein.

FIG. 18 illustrates an example of an apparatus 10 comprising an array 200 of dual polarized antennas some or all of which are the new dual polarized antenna 100 which comprises one or more new dipole antennas 20, 120. The dual polarized antennas of the first array 200 are configured to operate at the same first operational frequency band.

The apparatus 10 also comprises an array 202 of dual polarized antennas 102. The dual polarized antennas 102 of the second array 202 are configured to operate at a shared second operational frequency band.

The first operational frequency band and the second operational frequency band are different. In at least some examples, the first operational frequency band and the second operational frequency band do not overlap.

Although in the example illustrated the first operational frequency band is a lower frequency than the second operational frequency band (first array 200 has a greater pitch between dual polarized antennas than the second array 202) in other examples the first operational frequency band can be higher than the second operational frequency band (second array 202 has a greater pitch between dual polarized antennas than the first array 200).

The apparatus 10 can, for example be a multi-band dual-polarized antenna panel, also called MBPA (Multi Band Panel Antenna).

In this example, the first dual polarized antennas 100 of the first array 200 and the second dual polarized antennas 102 of the second array 202 are interleaved.

The first array 200 and the second array 202 overlap. The first array 200 occupies a first area in a first plane, and the second array 202 occupies a second area in a second plane, a projection of the first area in a direction orthogonal to the first plane intersect the second area. The first plane and the second plane can be parallel. The first plane and the second plane can, in some but not necessarily all examples, be co-planar.

Figure 19A:
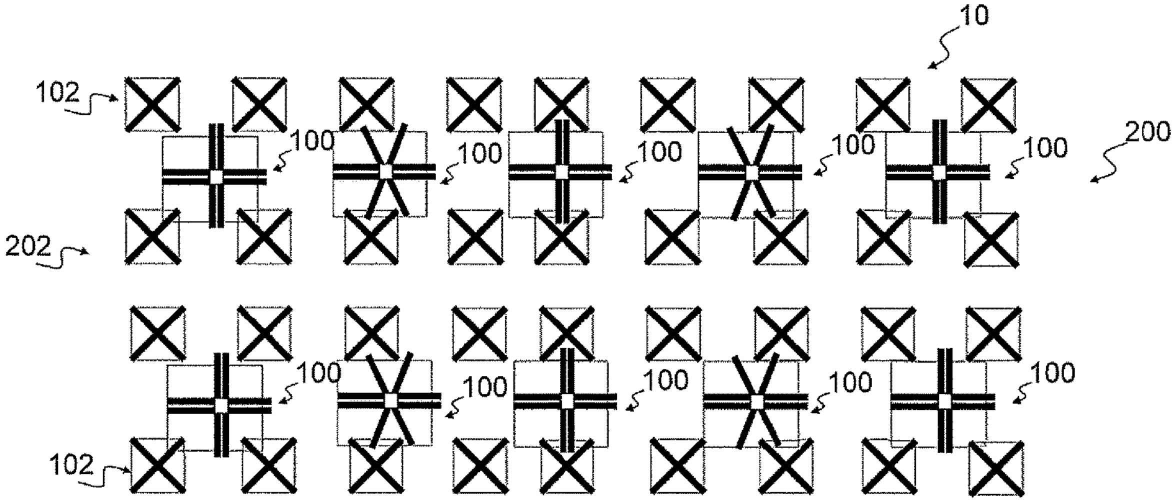
FIG. 19A shows another example of the subject matter described herein.
Figure 19B:
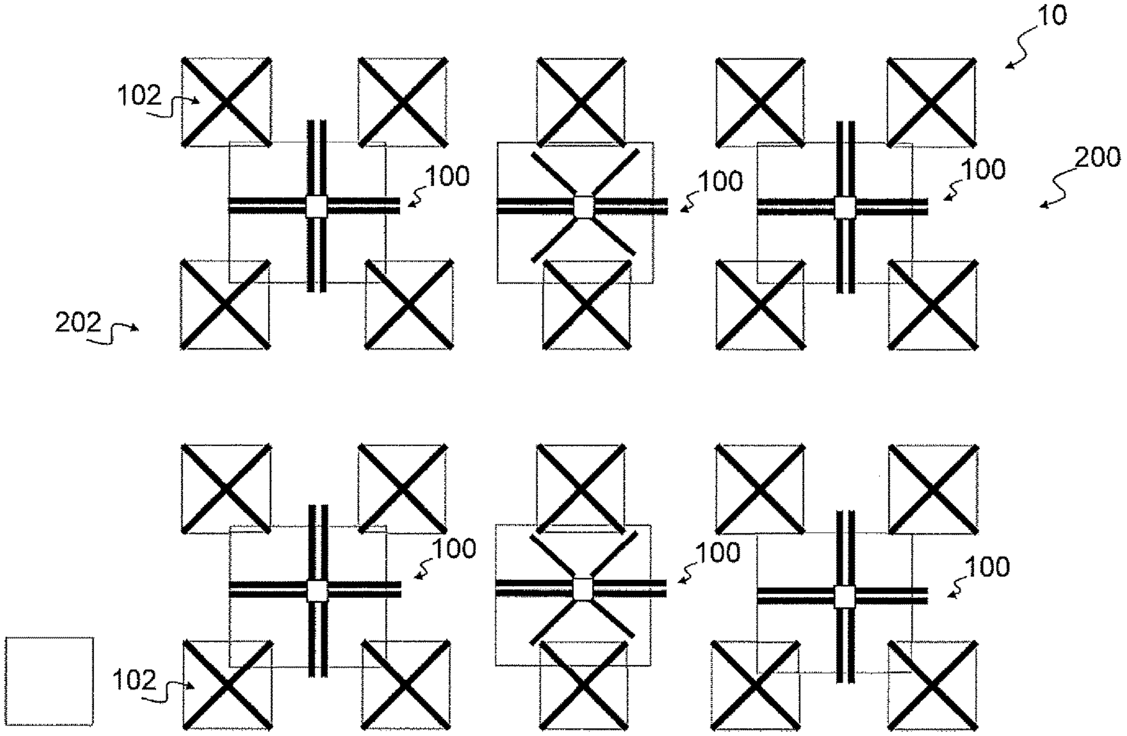
FIG. 19B shows another example of the subject matter described herein.

For some particular cases—for example, when the ratio of pitch between dual polarized antennas in the respective arrays 200, 202 cannot be reduced by an even factor, it may be desirable to use a combination of regular-cross dual polarized antennas (FIG. 3) and splayed-cross dual polarized antennas (FIG. 4). FIGS. 19A and 19B illustrate some examples.

FIG. 20A, 20B show an example of the splayed-cross dual polarized antenna 100. FIG. 20A is a perspective view with a director 2 attached. FIG. 20B is a top view. The splayed-cross dual polarized antenna 100 has previously been described with reference to FIG. 3.

The arrays 200, 202 can for example be phased arrays.

The arrays 200, 202 can for example be configured for multiple-input multiple-output (MIMO) operation.

The illustrated arrays 200, 202 can for example be configured to operate with the same orthogonal dual polarizations P1, P2.

Figure 22:
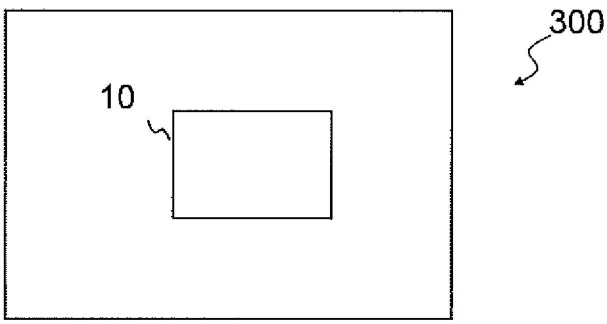
FIG. 22 shows another example of the subject matter described herein.

FIG. 22 illustrates an example of a network access node 300 such as a base station or base station system that comprises the apparatus 10.

Where a structural feature has been described, it may be replaced by means for performing one or more of the functions of the structural feature whether that function or those functions are explicitly or implicitly described.

An operational frequency (operational bandwidth) is a frequency range over which an antenna can efficiently operate. An operational resonant frequency (operational bandwidth) may be defined as where the return loss S11 of the dipole antenna 20 is greater than an operational threshold T and where the radiated efficiency is greater than an operational threshold.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term ‘comprise’ is used in this document with an inclusive not an exclusive meaning. That is any reference to X comprising Y indicates that X may comprise only one Y or may comprise more than one Y. If it is intended to use ‘comprise’ with an exclusive meaning then it will be made clear in the context by referring to “comprising only one . . . ” or by using “consisting”.

In this description, reference has been made to various examples. The description of features or functions in relation to an example indicates that those features or functions are present in that example. The use of the term ‘example’ or ‘for example’ or ‘can’ or ‘may’ in the text denotes, whether explicitly stated or not, that such features or functions are present in at least the described example, whether described as an example or not, and that they can be, but are not necessarily, present in some of or all other examples. Thus ‘example’, ‘for example’, ‘can’ or ‘may’ refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term ‘a’ or ‘the’ is used in this document with an inclusive not an exclusive meaning. That is any reference to X comprising a/the Y indicates that X may comprise only one Y or may comprise more than one Y unless the context clearly indicates the contrary. If it is intended to use ‘a’ or ‘the’ with an exclusive meaning then it will be made clear in the context. In some circumstances the use of ‘at least one’ or ‘one or more’ may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:

a dipole antenna, configured for operation with a first polarization, the dipole antenna comprising:

a feed; and a pair of conductive elements fed by the feed, wherein the pair of conductive elements are grounded to shield the feed from external electric fields, and extend in parallel on opposing sides of the feed and then diverge; and wherein each bend in the conductive element before an extremity of the conductive element defines a bearing, and a sum of said bearings for one of the pair of conductive elements and a sum of said bearings for the other one of the pair of conductive elements are different by substantially 90 degrees.

2. An apparatus as claimed in claim 1, wherein the dipole antenna comprises a pair of dipole arms configured for the first polarization wherein one of the dipole arms comprises the pair of conductive elements.

3. An apparatus as claimed in claim 1, wherein the pair of conductive elements, where parallel, are parallel to a virtual line aligned with the first polarization and then diverge from that virtual line.

4. An apparatus as claimed in claim 1, wherein the pair of conductive elements diverge symmetrically from a virtual line aligned with the first polarization.

5. An apparatus as claimed in claim 1, wherein the pair of conductive elements, at least where they diverge, have reflection symmetry in a virtual line aligned with the first polarization.

6. An apparatus as claimed in claim 1, wherein the pair of conductive elements diverge via one or more pairs of correspondingly opposite bends.

7. An apparatus as claimed in claim 1, wherein one of the pair of conductive elements extends substantially in a first direction to a first extremity and the other of the pair of conductive elements extends substantially in a second direction towards a second extremity, wherein the second direction is orthogonal to the first direction.

8. An apparatus as claimed in claim 1, wherein the conductive elements comprise an L-shaped portion wherein one limb of the L extends from a ground plane to a vertex of the L and the other limb of the L extends from the vertex parallel to the feed.

9. An apparatus as claimed in claim 1, wherein at least one of the pair of conductive elements bends towards or away from a ground plane.

10. An apparatus as claimed in claim 1, wherein the pair of conductive elements are asymmetric and bend towards or away from a ground plane by different amounts.

11. An apparatus as claimed in claim 1, wherein the pair of conductive elements are asymmetric and have different lengths.

12. An apparatus as claimed in claim 1, wherein the dipole antenna comprises:

another pair of conductive elements fed by the feed, wherein the other pair of conductive elements are grounded, and extend in parallel on opposing sides of the feed and then diverge, wherein the pair of conductive elements extend in parallel on opposing sides of the feed in a first direction and the other pair of conductive elements extend in parallel on opposing sides of the feed in a direction opposite the first direction.

13. An apparatus as claimed in claim 12, wherein the second dipole antenna comprises another pair of conductive elements fed by the second feed, wherein the other pair of conductive elements are grounded, and extend in parallel on opposing sides of the second feed and then diverge, wherein the pair of conductive elements of the second dipole antenna extend in parallel on opposing sides of the feed in a second direction and the another pair of conductive elements of the second dipole antenna extend in parallel on opposing sides of the second feed in a direction opposite the second direction.

14. An apparatus as claimed in claim 1, comprising:

a second dipole antenna, configured for operation with a second polarization comprising:

a second feed; and a pair of conductive elements fed by the second feed, wherein the pair of conductive elements are grounded, and extend in parallel on opposing sides of the second feed and then diverge, wherein the dipole antenna and the second dipole antenna are co-located to form a dual-polarized antenna.

15. An apparatus as claimed in claim 14, wherein one of the pair of conductive elements of the dipole antenna, at an extremity, is interconnected to an extremity of one of the pair of conductive elements of the second dipole antenna.

16. An apparatus as claimed in claim 14, comprising a ground plane, wherein the feed is provided with a first planar printed wiring board that is orthogonal to the ground plane and the second feed is provided with a second planar printed wiring board that is orthogonal to the ground plane and orthogonal to the first planar printed wiring board, wherein the first planar printed wiring board and the second planar printed wiring board intersect to form a cross in a cross-section parallel to the ground plane.

17. An apparatus as claimed in claim 14, wherein a first array of the dual polarized antennas are configured to operate at the same first operational frequency band.

18. An apparatus as claimed in claim 17, comprising a second array of second dual polarized antennas configured to operate at the same second operational frequency band that is different to the first operational frequency band, wherein the first dual polarized antennas of the first array and the second dual polarized antennas of the second array are interleaved.

19. A network node comprising the apparatus of claim 1.

20. An apparatus, comprising:

a dipole antenna, configured for operation with a first polarization, the dipole antenna comprising:

a feed; and a pair of conductive elements fed by the feed, wherein the pair of conductive elements are grounded to shield the feed from external electric fields, and extend in parallel on opposing sides of the feed and then diverge; and wherein one of the pair of conductive elements extends substantially in a first direction to a first extremity and the other of the pair of conductive elements extends substantially in a second direction towards a second extremity, wherein the second direction is orthogonal to the first direction.

21. An apparatus, comprising:

a dipole antenna, configured for operation with a first polarization, the dipole antenna comprising:

a feed; and a pair of conductive elements fed by the feed, wherein the pair of conductive elements are grounded to shield the feed from external electric fields, and extend in parallel on opposing sides of the feed and then diverge; and wherein the dipole antenna further comprises:

another pair of conductive elements fed by the feed, wherein the other pair of conductive elements are grounded, and extend in parallel on opposing sides of the feed and then diverge, wherein the pair of conductive elements extend in parallel on opposing sides of the feed in a first direction and the other pair of conductive elements extend in parallel on opposing sides of the feed in a direction opposite the first direction.

* * * * *